United States Patent [19]

Lappington et al.

[11] Patent Number: 5,526,035
[45] Date of Patent: Jun. 11, 1996

[54] TRANSACTION BASED INTERACTIVE TELEVISION SYSTEM

[75] Inventors: John P. Lappington, Lawrenceville, Ga.; Susan K. Marshall, Greenwood Village, Colo.

[73] Assignee: Zing Systems, L.P., Englewood, Colo.

[21] Appl. No.: 252,942

[22] Filed: Jun. 1, 1994

Related U.S. Application Data

[63] Continuation of Ser. No. 796,085, Nov. 20, 1991, Pat. No. 5,343,239.

[51] Int. Cl.$^6$ ........................................................ H04N 7/08
[52] U.S. Cl. .............................. 348/13; 348/12; 348/473
[58] Field of Search ............................... ; 348/2, 6, 7, 10, 348/12, 13, 473, 460, 476, 478, 486; 364/410, 411, 412; 273/433–439; H04N 7/08, 7/087, 7/10, 7/173, 7/14, 7/16

[56] References Cited

U.S. PATENT DOCUMENTS

| Re. 28,507 | 8/1975 | Rusch . |
| 3,095,653 | 7/1963 | Corrigan . |

(List continued on next page.)

FOREIGN PATENT DOCUMENTS

| 0267085A1 | 10/1987 | European Pat. Off. .......... G07F 7/10 |
| 0338936A1 | 4/1989 | European Pat. Off. ........ G06F 15/44 |
| 0399897A1 | 5/1990 | European Pat. Off. .......... H04H 9/00 |
| 1287304 | 8/1972 | United Kingdom . |
| 2120507 | 5/1983 | United Kingdom . |
| 2154344 | 4/1985 | United Kingdom . |
| 2231470 | 11/1990 | United Kingdom . |

OTHER PUBLICATIONS

"This Just In—TV Answer: Interactive Device Below $500", HFD, The Weekly Home Furnishings Newspaper, 1 page, date unknown.

"Marketing Update—TV Answer: New and Improved", Interactive World, 1 page, Nov. 1992.
"New Boss Lehman Challenges Staff To Come Up With Best TV Answer", The Washington Times, 2 pages, Friday, Nov. 20, 1992.
"TV Answer Closer To Starting Gate", Direct, 2 pages, Jan., 1993.
TV Answer New Summary, 5 pages, Feb., 1993.
TV Answer—Applications, 4 pages, Feb., 1993.
TV Answer—Personal TV Unit, 2 pages, Feb., 1993.
"Changing The Way America Uses Television", TV Answer, 1 page, 1993.
TV Answer—Service Providers, 2 pages, 1993.

(List continued on next page.)

*Primary Examiner*—David E. Harvey
*Attorney, Agent, or Firm*—Fliesler, Dubb, Meyer & Lovejoy

[57] ABSTRACT

An interactive television system where interactive information is inserted in the vertical blanking interval of a standard television signal. The signal is received and decoded by a settop decoder which sends the decoded signal via an infrared signal to a handheld device. The viewer using the handheld device can interact with a game, sports, or educational event or other presentation on the television. The system includes a proprietary high level command language and programmer (PIU) tables which are maintained in the memory of the handheld device. The PIU tables store the transactions of the various events presented on the television. The transactions are sent from the insertion system to the decoder throughout the broadcast of the television program. Thus, for a sports event with interleaved commercials, one or more of the PIU tables would be used to store a collection of transactions used for the main event and one or more additional PIU tables are used for storing transactions for each of the interleaved commercials. This system allows a viewer to enter and exit any event at any time without having to wait for information to be downloaded and without losing any scores. Further, the system allows the user to change from event to event such as, for example, by tuning to different stations and be able to immediately interact and have responses scored and stored.

32 Claims, 12 Drawing Sheets

U.S. PATENT DOCUMENTS

| | | |
|---|---|---|
| 3,245,157 | 4/1966 | Laviana . |
| 3,359,655 | 12/1967 | Audebert . |
| 3,378,937 | 4/1968 | Warren . |
| 3,546,791 | 12/1970 | Koos et al. . |
| 3,606,688 | 9/1971 | Zawels et al. . |
| 3,641,685 | 2/1972 | Zawels et al. . |
| 3,671,668 | 6/1972 | Reiffel . |
| 3,777,410 | 12/1973 | Robinson . |
| 3,789,136 | 1/1974 | Haith et al. . |
| 3,810,627 | 5/1974 | Levy . |
| 3,819,862 | 6/1974 | Hedges . |
| 3,824,334 | 7/1974 | Jacobson et al. . |
| 3,858,212 | 12/1974 | Tompkins et al. . |
| 3,909,002 | 9/1975 | Levy . |
| 3,909,818 | 9/1975 | Dalke et al. . |
| 3,936,595 | 2/1976 | Yanagimachi et al. . |
| 3,987,397 | 10/1976 | Belcher et al. . |
| 3,990,012 | 11/1976 | Karnes . |
| 4,025,851 | 5/1977 | Haselwood et al. . |
| 4,034,990 | 7/1977 | Baer . |
| 4,044,380 | 8/1977 | Justice et al. . |
| 4,052,798 | 10/1977 | Tomita et al. . |
| 4,054,911 | 10/1977 | Fletcher et al. . |
| 4,114,141 | 9/1978 | Travis . |
| 4,115,846 | 9/1978 | Laine . |
| 4,141,548 | 2/1979 | Everton . |
| 4,174,517 | 11/1979 | Mandel . |
| 4,194,198 | 3/1980 | Baer et al. . |
| 4,228,422 | 10/1980 | Perry . |
| 4,264,924 | 4/1981 | Freeman . |
| 4,266,214 | 5/1981 | Peters, Jr. . |
| 4,326,221 | 4/1982 | Mallos et al. . |
| 4,339,798 | 7/1982 | Hedges et al. . |
| 4,372,558 | 2/1983 | Shimamoto et al. . |
| 4,387,271 | 6/1983 | Artom . |
| 4,572,509 | 2/1986 | Sitrick . |
| 4,573,072 | 2/1986 | Freeman . |
| 4,592,546 | 6/1986 | Fascenda et al. . |
| 4,593,904 | 6/1986 | Graves . |
| 4,608,601 | 8/1986 | Shreck et al. . |
| 4,609,358 | 9/1986 | Sangster . |
| 4,652,998 | 3/1987 | Koza et al. . |
| 4,745,468 | 5/1988 | Van Kohorn . |
| 4,786,985 | 11/1988 | Williams . |
| 4,807,031 | 2/1989 | Broughton et al. . |
| 4,847,698 | 7/1989 | Freeman . |
| 4,876,592 | 10/1989 | Von Kohorn . |
| 4,910,775 | 3/1990 | Yves et al. ............... 380/25 |
| 4,918,516 | 4/1990 | Freeman . |
| 4,926,255 | 5/1990 | Von Kohorn . |
| 4,956,709 | 9/1990 | Richer et al. . |
| 4,977,455 | 12/1990 | Young . |
| 5,013,038 | 5/1991 | Luxenberg et al. . |
| 5,034,807 | 7/1991 | Von Kohorn . |
| 5,057,915 | 10/1991 | Von Kohorn ............... 358/84 |
| 5,073,931 | 12/1991 | Audebert et al. ............... 380/23 |
| 5,083,800 | 1/1992 | Lockton . |
| 5,093,718 | 3/1992 | Hoarty et al. . |
| 5,093,921 | 3/1992 | Bevins, Jr. . |
| 5,120,076 | 6/1992 | Luxenberg et al. . |
| 5,128,752 | 7/1992 | Von Kohorn . |
| 5,136,644 | 8/1992 | Audebert et al. ............... 380/25 |
| 5,227,874 | 7/1993 | Von Kohorn . |
| 5,249,044 | 9/1993 | Von Kohorn . |
| 5,283,734 | 2/1994 | Von Kohorn . |
| 5,297,205 | 3/1994 | Audebert et al. ............... 380/23 |

OTHER PUBLICATIONS

TV Answer—Backgrounder "The Birth of an Industry: Interactive Video and Data Service", 2 pages, Apr. 1993.

TV Answer—Background "The Transmission/Reception Path", 1 page, Apr. 1993.

TV Answer—Profile "Corporate Profile", 1 page, Apr. 1993.

TV Answer—Press Release "TV Answer's Interactive Technology Adopted By Montgomery, Zukerman, Davis, Inc. For Inclusion In Client's Marketing Mix", 2 pages, Apr. 5, 1993.

TV Answer—Press Release "TV Answer And Griffin Promotions To Create Interactive Marketing Programs", 2 pages, Apr. 5, 1993.

TV Answer—News Release "TV Answer Teams With Road Runner Sports, Inc. For Easy Fitness Wear Ordering Via Interactive Television", 2 pages, Apr. 12, 1993.

TV Answer—News Release "TV Answer and PBS Team Up To Enhance Viewer Service Through Interactive Television", 2 pages, Apr. 19, 1993.

TV Answer—Press Release "TV Answer And DMGT Corp. Form Alliance To Add Interactive Television To Direct Marketers' Service Options", 2 pages, Apr. 22, 1993.

TV Answer—News Release "TV Answer Lets Consumers Order Exercise Equipment Via Interactive Television Without Missing A Beat Of Their Workout As a Result Of Agreement With Fitness Quest", 2 pages, May 19, 1993.

TV Answer—News Release "Jerrold Communications, And TV Answer Announce Plans To Provide Interactive Services For TV Answer's Cable Affiliates", 3 pages, Jun. 7, 1993.

TV Answer—Backgrounder "TV Answer: More Than Just Interactive Television", 1 page, Jun. 1993.

"PBS and TV Answer Team To Bring Interactivity To Public Television", Transactions, 8 pages, Jun. 1993.

Interactive Systems, Inc. Core Technology, brochure, 2 pages, date unknown.

"The Interactive Unit", promotional brochure, 5 pages, date unknown.

"The InTOUCH TV System, A Technology Description", by Thad A. Young and William Laumeister, Interactive Systems, Beaverton, Oregon, pp. 1–10, date unknown.

The International Jounral of ITV, International Edition, Summer 1993, by Paul McKellips, ©Interactive Systems Worldwide, Inc., pp. 1–8.

TRANSACTION BASED INTERACTIVE TELEVISION SYSTEM

This application is a Continuation of Ser. No. 07/796,085, filed Nov. 20, 1991, now U.S. Pat. No. 5,343,239.

LIMITED COPYRIGHT WAIVER

A portion of the disclosure of this patent document contains material (code listings and message listings) to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

Copyright 1991 Watch & Win

FIELD OF THE INVENTION

The present invention is directed to an interactive communication system and in particular, one adapted for use with existing broadcast, cable, and satellite television or radio or other communication systems for allowing participants and viewers to interact with the system in order, by way of example only, to shop, enter into games of skill, and engage in educational presentations and other events where information is provided and the participant or viewer can make an appropriate response thereto.

BACKGROUND OF THE INVENTION

Many products have been introduced that provide the capability for the viewer to participate in television programs. These products accept cue signals transmitted to handheld devices that measure and control the response of the viewers as the viewers participate in the program. Some of these devices implement hardware that monitors the response or the results of responses accumulated over time and reports the results to a central site. One of the early embodiments of this technology was the QUBE interactive two-way television system introduced by Warner Communications at least as early as 1982. Other systems include the INDAX system field tested at least as early as 1984 by Cox Communications, and the Interactive Networks System field tested during 1990 and 1991.

The Interactive Network System is at least in part described in U.S. Pat. No. 4,592,546 which is entitled "GAME OF SKILL PLAYABLE BY A REMOTE PARTICIPANTS IN CONJUNCTION WITH A LIVE EVENT" and issued on Jun. 3, 1986. This system, in one embodiment, contemplates the use of the vertical blanking interval of the standard NTSC television signal for downloading to a remote viewer's handheld device game play or other interactive instructions. In addition over the vertical blanking interval (VBI) a lock-out signal can be sent to prevent scores from being credited after the answer to the event has been presented on the screen. This system demonstrates the capability of having the scores accumulate throughout the television presentation, then allows the final scores to be burst back as, for example, digital data over a modem after the program is completed and during a time interval which is significantly less than the total time interval of the program.

All of the above products fall generally within one of two categories of product. The first category consists of software that is coded in firmware in a remote participant's handheld device where the participant can start playing along with the interactive program as soon as the programs begins. The second category maintains the software in random access memory in the viewer's handheld device where the program must be downloaded into the device prior to the event starting. This process may require up to five minutes requiring the participant to wait prior to participating in the interactive program.

Both categories of devices are designed to work with one interactive program at a time, where the participant must complete that program before being able to participate in a new program.

When these products are compared to the television viewing habits of consumers, significant deficiencies are apparent. Most viewers do not continuously watch one program. Viewers generally switch between several channels. This is so pervasive in the industry that the term "grazing" has been given to the habit of switching between channels during the programs.

SUMMARY OF THE INVENTION

An interactive system concept that is compatible with the participants viewing habits is required for interactive television to be successful. This system must include the ability to maintain several interactive programs active at the same time and not require advance downloading of programs or initialization information. When the viewer tunes the channel, the viewer is immediately able to participate in the interactive program either if the viewer is for the first time watching that program or the viewer is returning after watching some other program for a brief or extended period.

In the situation where a viewer returns to a program that was previously watched, the interactive game continues, leaving out only the part that was missed. Any cumulative score for the part of the event actually particpated in can be entered. The result would be the same as if the missed questions were not answered.

The present invention is designed to overcome the problems and disadvantages associated with the prior art and to address the way participants actually view television events. In particular, the present invention provides for a transaction based system whereby the various interactions, which can occur over a period time, between the system and the viewer, can be broken down into and defined by a plurality of transactions. The transactions are stored in programmer (PIU) tables which are identified by programmer identification (PID) numbers and which are provided in non-volatile memory in, for an example, a handheld device used by the viewer to interact with the television presentation. Data to update and reprogram each of the tables is supplied, in a preferred embodiment, over the vertical blanking interval in conjunction with the television presentation. Once the structure of the PIU table is established, the game can then be initiated through a high level command language which is sent over and incorporated in succeeding VBI lines in order to initiate the various transactions.

With a transaction based system, multiple games and interactions dealing with different subject matter can be accomplished in an interleaved manner. For example, during an hour long television presentation, a number of transactions can be strung together in order to interact with a continuous theme being presented in the main programming for that hour. Additionally, should the main programming be broken down into sections, the transactions can be grouped in as many groupings as necessary in order to represent the desired interactivity with each portion of the main program. Still in addition, the present system has the capability of allowing, for example, a transaction or grouping of transactions to take place for each of the multiple commercials which are spread throughout the main presentation. Thus, the present system affords the ability for the viewer to play and interact with multiple transactions which can be associated with totally different interactive presentations on the screen and have all of the interactions properly recorded and scored. As each of PIU tables can be established through the use of only a few VBI lines, the system allows a viewer to begin playing a game or interacting with the television presentation during any portion of the presentation and also allows the viewer to switch channels or "graze" and still be immediately able to play or interact with any game or presentation presently presented on the newest selected channel.

This ability presents a significant advantage over the prior art which requires, as indicated above, that the viewer pretune to a specific channel ahead of the game so that the necessary game software can be downloaded, over a significant interval of time, into the remote terminal before the game can be commenced. Further, such prior devices only afford the viewer the ability to play or interact with a single game or main event at a time without the ability to switch between events interleaved on the same channel, as for example, between the main event and commercials, or to switch to other channels and be able to interact with the event of that channel and have the results scored. Such grazing would not be available with prior devices due to the fact that a remote terminal would not have been properly programmed. In fact, should the viewer change channels, with prior devices the viewer would then not be able to interact with the event on that channel until the next event began or would have to wait for the software for that particular event to be downloaded before commencing with the interactivity.

Accordingly, the present invention provides for an interactive presentation system which comprises a device for receiving at a remote location interactive data in assocation with the presentation of an event. The interactive presentation system further includes a device for defining transaction structures for allowing the interactive active data to be communicated only as needed for each particular aspect of an event, and throughout the event such that there is no interruption of the event. Further, the transaction structures allow for events and aspects within each event to be interleaved while maintaining interactivity with each event. The system further includes a device for reporting the results of the interactivity.

The receiver mechanism of the present invention also includes a settop decoder for decoding interactive data received in conjunction with a signal of the event. The receiver device additionally includes a handheld terminal for allowing the user to interact with the event and a mechanism for providing communciation between the settop decoder and the handheld terminal.

In another aspect of the invention, the transaction structure includes a device for storing identification for each of the plurality of transaction tables and a device for storing at least a portion of the interactive data and a user response to the interactive data.

In another aspect of the invention, the interactive data includes interactive commands, and also event specific data associated with each specific event or aspect of each event.

In yet another aspect of the invention, the receiving device includes a message display and the interactive commands cause messages to be displayed on the message display.

Yet in a further aspect of the invention, the receiving device can receive messages to be displayed and the transaction structure can store received messages. The interactive commands are for additionally causing either a received message or a stored message to be displayed in order to initiate or to continue with an interactive presentation.

Thus, with the present invention, the viewer is afforded the ability of interacting with a multiplicity of interleaved events, the ability to stop and start the interactivity at the viewers time of chosing, the ability to select events offered on a multiplicity of channels and to interact within a time period and in the order desired by the viewer and to have all of the responses for the various events scored and stored for the portion participated in by the viewer.

DETAILED DESCRIPTION OF THE PREFERRED EMBODIMENT

Transaction Based Interactive System

Figure 1:
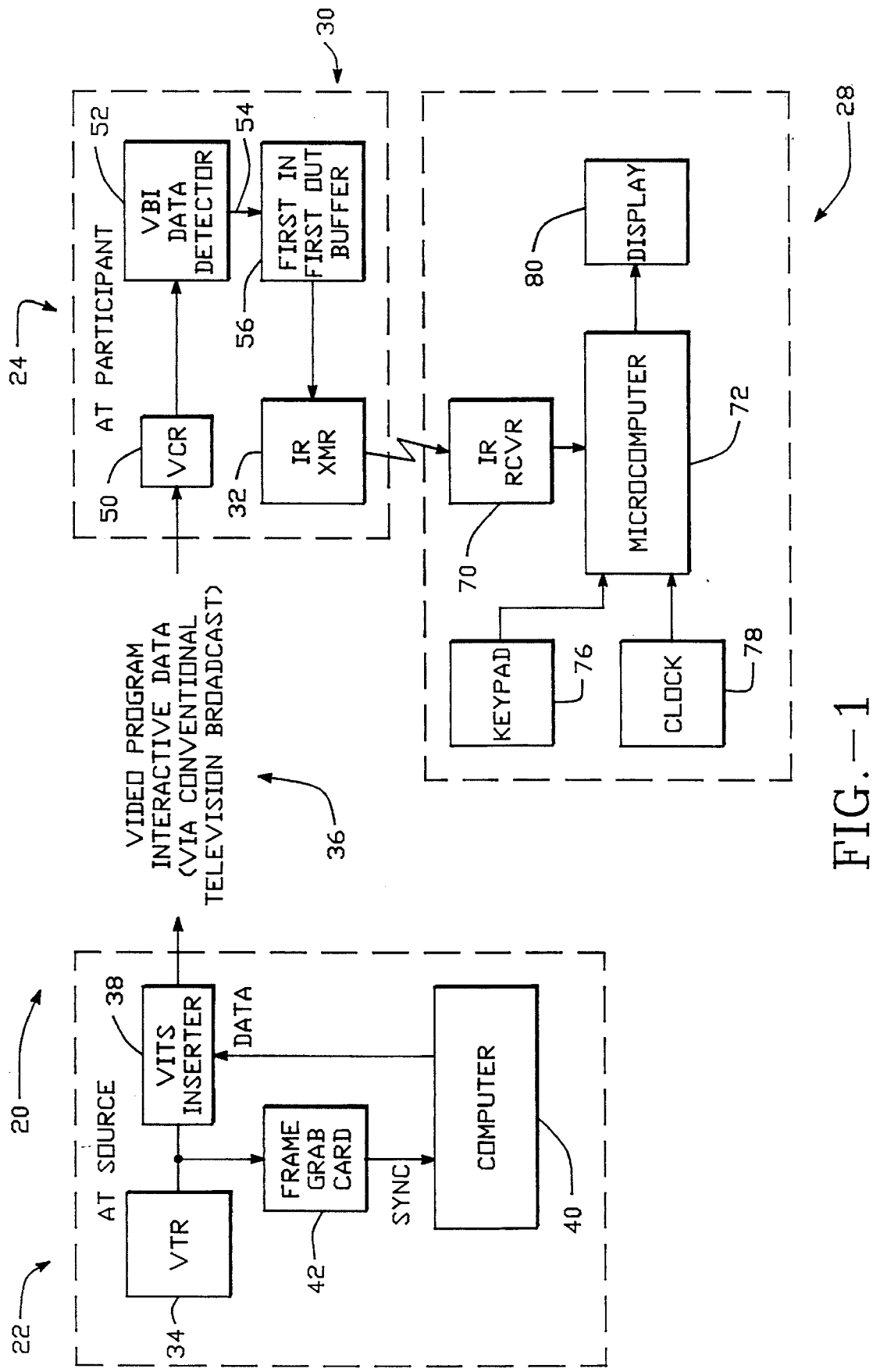
FIG. 1 depicts a schematical representation of an embodiment of the inserting system and the decoding system of an embodiment of the transaction based interactive television system of the invention.

An interactive system 20 (FIG. 1) of the invention that includes the capability of allowing the viewer to participate with interactive television programs on many channels is best implemented by transmitting the interactive control information along with the television program.

One of the recognized approaches to transmit data in conjunction with a television video signals is to insert the data in lines 10 through 20 of the vertical blanking interval (VBI). An example of this method of transmitting data is closed captioning information which inserts data on line 21 of the VBI.

The system 20 has the data inserted with an insertion system 22 on the VBI of the program material prior to broadcasts and decoded with a decoding system 24 for the participant watching the program. At each receiving location 26, the data must be recovered from the VBI by the decoding system 24 which includes a decoder 30 and a handheld device 28, with the decoder 30 transmitting data to the handheld device 28 which is required to be used in order to participate in the interactive event.

Marketing considerations dictate that the settop data converter or decoder 30 decodes the VBI information and transmits the interactive data via an infrared transmission device 32 to the handheld device 28. Using IR transmission, the participant may move freely about the room keeping the handheld device 28 pointed in the general direction of the settop data converter 30.

The video tape recorder 34 of the insertion system 22 is used to play the source program of interest. This program may be a live event, and in that situation, a camera is substituted for the tape recorder. The output of the tape recorder 34 is a NTSC video and sound signal which can be transmitted through a video delivery system such as a cable or conventional television broadcast system 36 to a multiple of remote locations, for example, homes.

Figure 2:
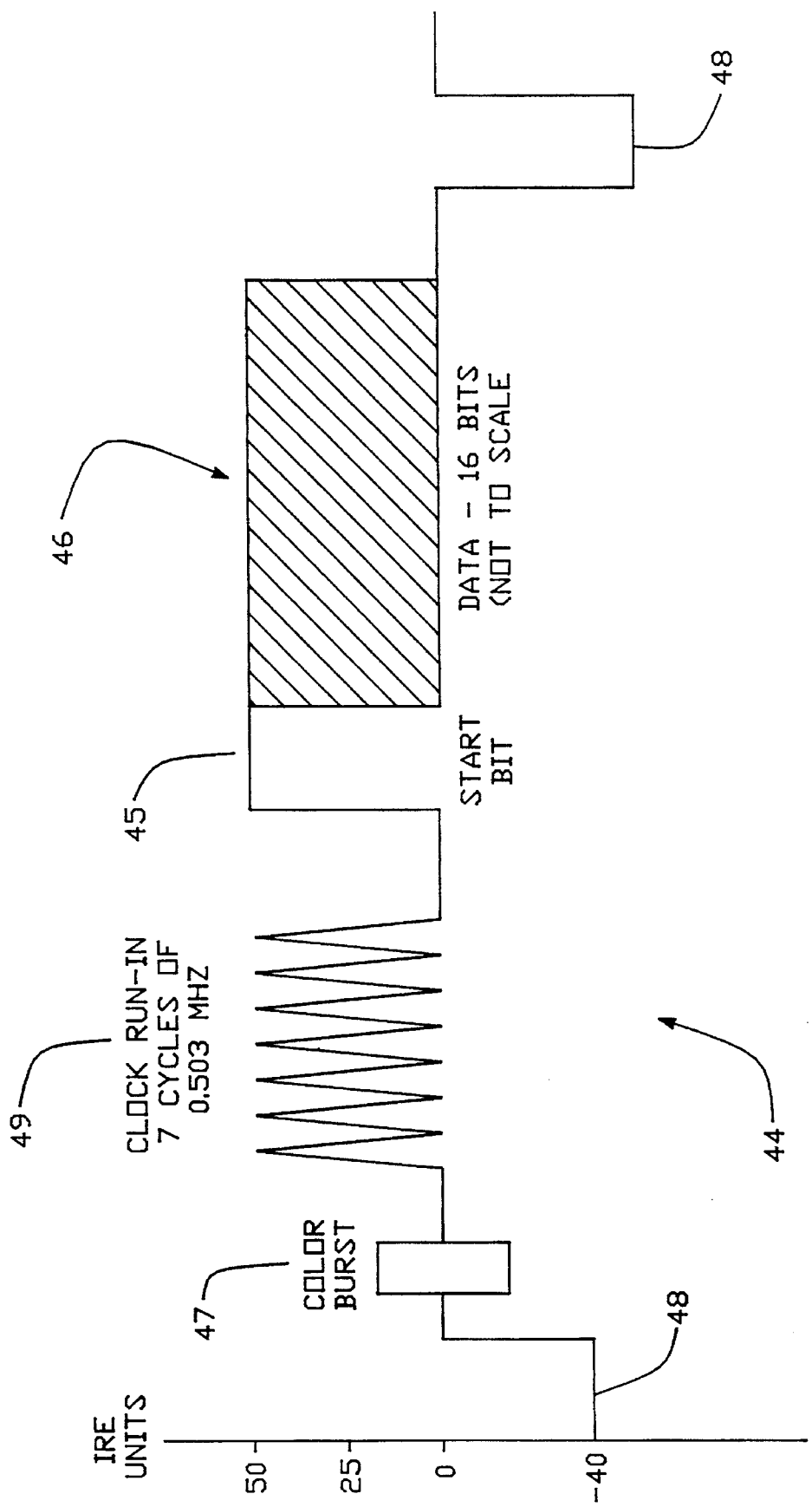
FIG. 2 depicts the format of a line of data in the vertical blanking interval.

The NTSC video output signal is supplied to a standard data bridge luminance inserter 38 which includes the capability to insert luminance modulated data on horizontal blanking interval lines within the vertical blanking interval. The interactive data to be inserted is provided, by a computer 40 which synchronizes this data using a conventional frame grabber card 42 providing hardware interrupts for the vertical and horizontal blanking intervals of the program material from the VTR 34. The format of a horizontal line 44 of data is shown in FIG. 2.

One format for data transmitted within the VBI that is both well documented and is considered to be reliable is the format chosen for closed captioning information. This format transmits a burst of data 46, preceded by a start bit 45, driving one line of the VBI and located between synchronization pulse 48. A color burst signal 47 and a clock run-in signal 49 are also depicted. Each burst is repeated at the television field rate of 16.67 milliseconds FIG. 3. This data format provides for 14-bits of data with a parity bit every seven bits.

Any conventional data format is acceptable with the understanding that the data may be inserted on blank lines within the vertical blanking interval. The output signal from the luminance or VITS inserter 38 is transmitted over any conventional television distribution system including a broadcast, satellite or cable delivery system. The individual television channel carrying the program is selected using a conventional TV tuner as found in a television or consumer VCR 50. If a VCR is used as the tuner, the VCR contains a demodulator to provide a baseband video output containing the video of the program from VTR 34 and the interactive data inserted by the luminance or VITS inserter 38.

The video signal is processed using, for example, a conventional VBI data removal circuit 52 to create a data stream 54 identical to the inserted interaction data stream.

For reliable transmission using infrared as a transmission system, the data rate in a preferred embodiment does not exceed 3,000-bits per second. The VBI data is recovered at a data rate of 500,000-bits per second. However, this rate occurs for a short burst during the vertical blanking interval. Thus, while active video is being transmitted, interactive data is recovered from the program source.

Settop Decoder or Converter 30:

The purpose of the settop converter 30 is to recover the data transmitted during the VBI at a high data rate and, using infrared, transmit that same information to the handheld device 28 at a much slower data rate of 3,000-bits per second. This can be solved using a first-in-first-out buffer 56 with different clocks for the input and output functions.

Figure 3:
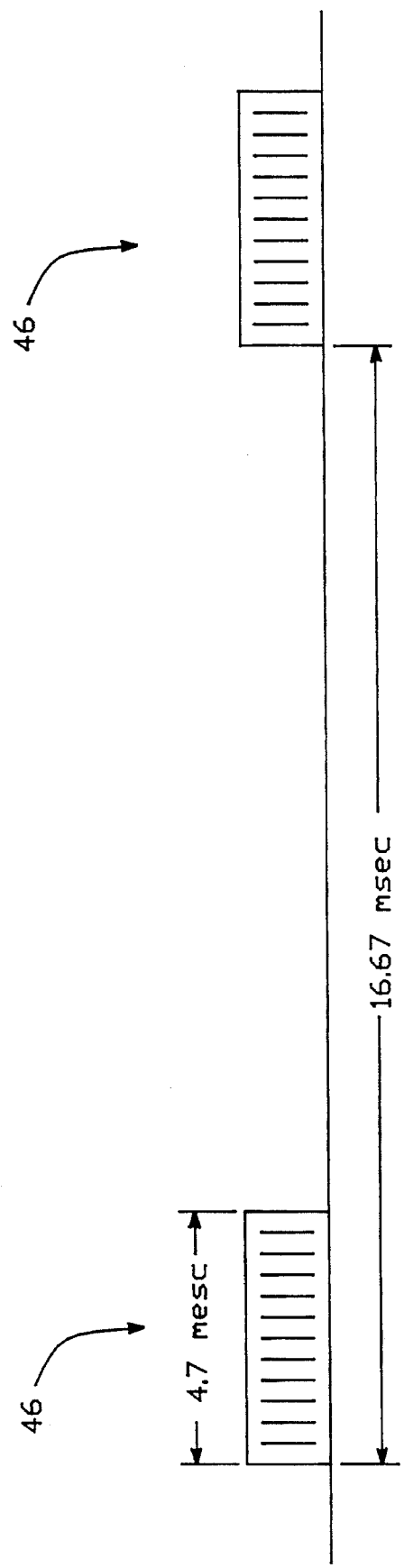
FIG. 3 depicts the data spacing for the data of FIG. 2.

The serial data stream is stored in the first-in-first-out buffer 56. Each group of 14-bits of data from a horizontal line 44 in the VBI is stored at the transmitted data rate of 500,000-bits per second. Since a specific horizontal line only occurs every 16.7 milliseconds, the data stream consists of 14-bits clocked at a high rate followed by 16.7 milliseconds of no data as shown in FIG. 3.

The output of the first-in-first-out buffer 56 is clocked at a data bit rate of 3,000-bits per second. Using this rate, the 14-bits are transmitted within 4.7 milliseconds as shown in FIG. 3.

The slower output rate from the first-in-first-out buffer 56 is necessary to insure that the output bit time is compatible with transmitting the data using an infrared modulator.

The infrared modulator or transmitter 32 consists of two oscillators running at a multiple of 3,000 Hz, with each phase locked to the output clock rate. If the bit from the buffer is a "1", the first oscillator is selected to drive the IR transmitter. If the bit is a "0", the second oscillator is selected to drive the IR transmitter. Using this FSK encoded data stream approach (FIG. 4), the IR transmitter radiates IR energy at a frequency determined by the serial data clocked out of the first-in-first-out buffer.

Thus from the above, it is evident that the interactive system includes a device for delivering one way low speed digital data to a handheld device that can be used to participate in interactive television programs.

Figure 5:
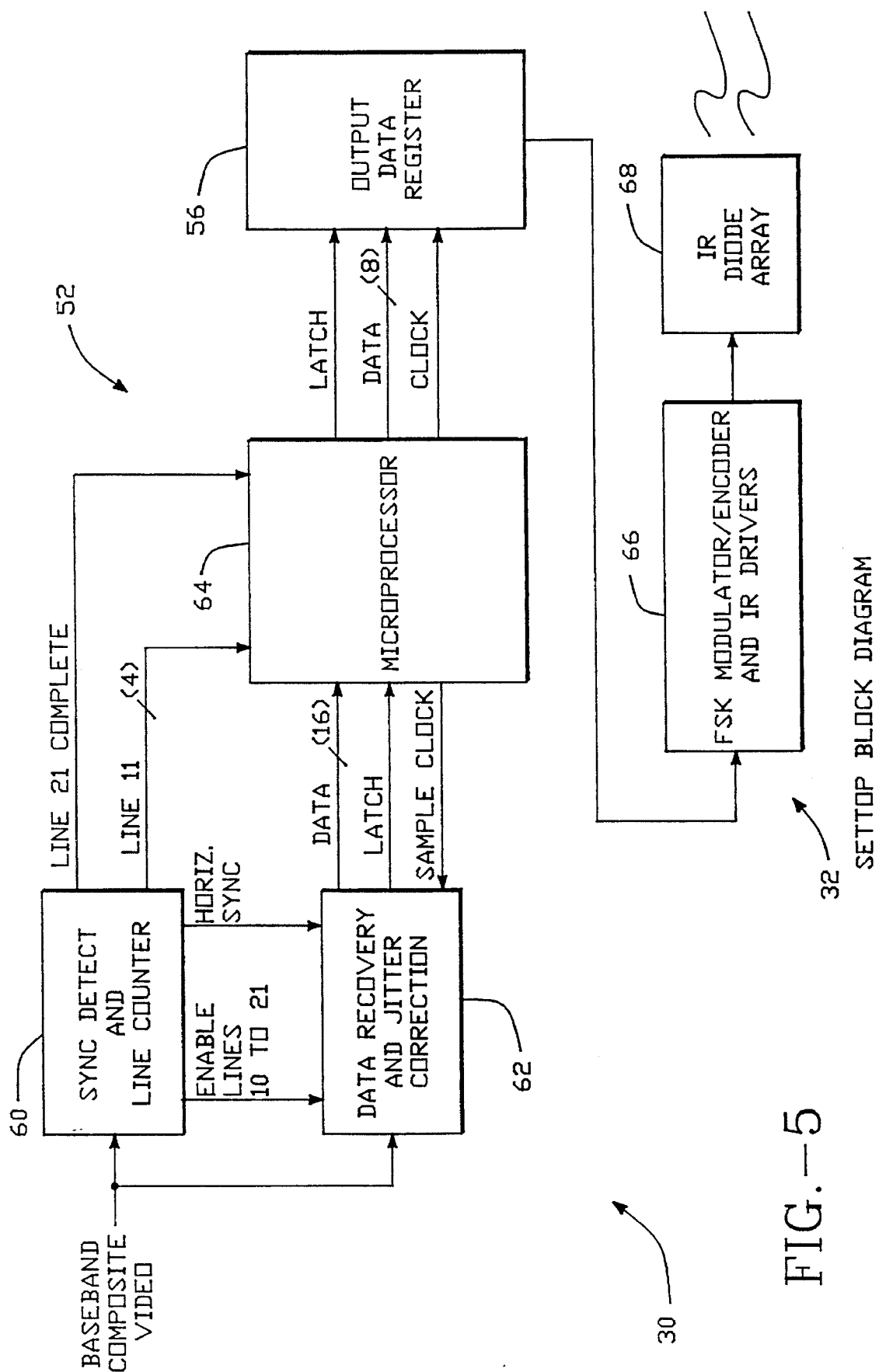
FIG. 5 depicts a more detailed schematical representation of the settop decoder of FIG. 1.

FIG. 5 depicts a more detailed schematical representation of the settop decoder 30 of the system as shown in FIG. 1. This settop decoder 30 is substantially similar to a conventional decoder for decoding VBI information used, for example, for closed caption applications. Additionally settop decoder 30 includes the IR modulator or transmitter 32 as described above. Viewing FIG. 5, it can be seen that the settop decoder 30 includes a synchronization detector and line counter 60 which receives the broadcast signal. Further, the settop decoder 30 includes a data recovery and jitter correction unit 62. These units 60, 62 communicate with the microprocessor 64 for causing the microprocessor 64 to latch VBI data to the register or first-in-first-out buffer 56. From buffer 56, the data is communicated to the FSK modulator and IR drive 66 and therefrom to the IR diode array 68. The FSK modulator and IR driver 66 and the IR diode array 68 comprise the IR transmitter 32.

Figure 6:
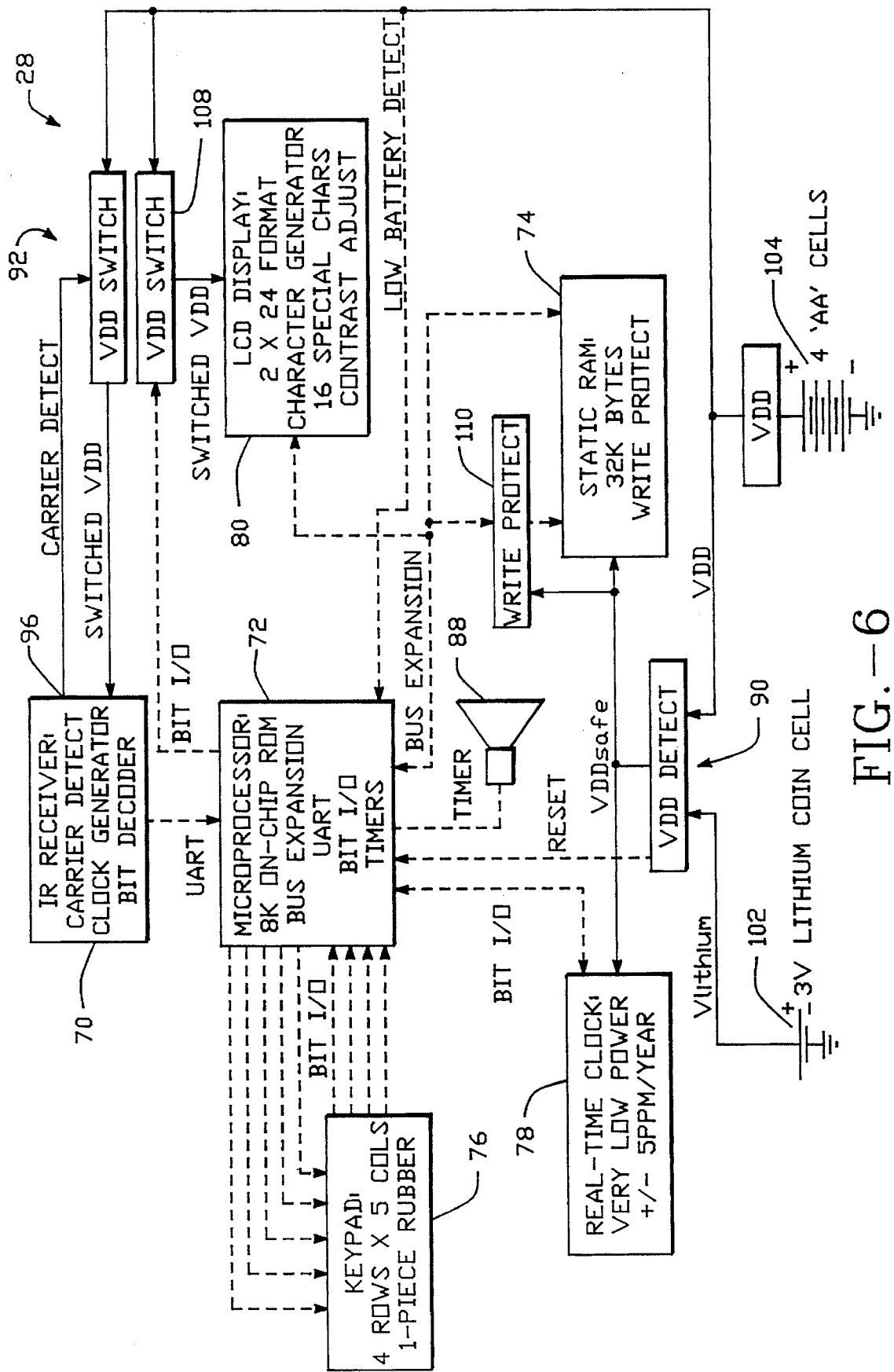
FIG. 6 depicts a more detailed schematic representation of the handheld device or terminal of FIG. 1.

Handheld Device or Terminal 28:

The handheld interactive, depicted in FIG. 6, provides the means to participate in the interactive program. It decodes the data stream from the settop converter 30 and implements the interactive program.

The hardware modules within the handheld device 28 consist of an infrared photo detector 70 to sense the IR signal from the settop converter 30, a microprocessor 72 with a control program, which can implement the command code discussed below stored in an on-board ROM, a RAM 74 including both non-volatile and temporary storage for information sent via the IR link, a keyboard 76 for data entry, a clock circuit 78 to track actual time, and a LCD display 80. A block diagram of the handheld device is shown FIGS. 1 and 6.

Figure 7:
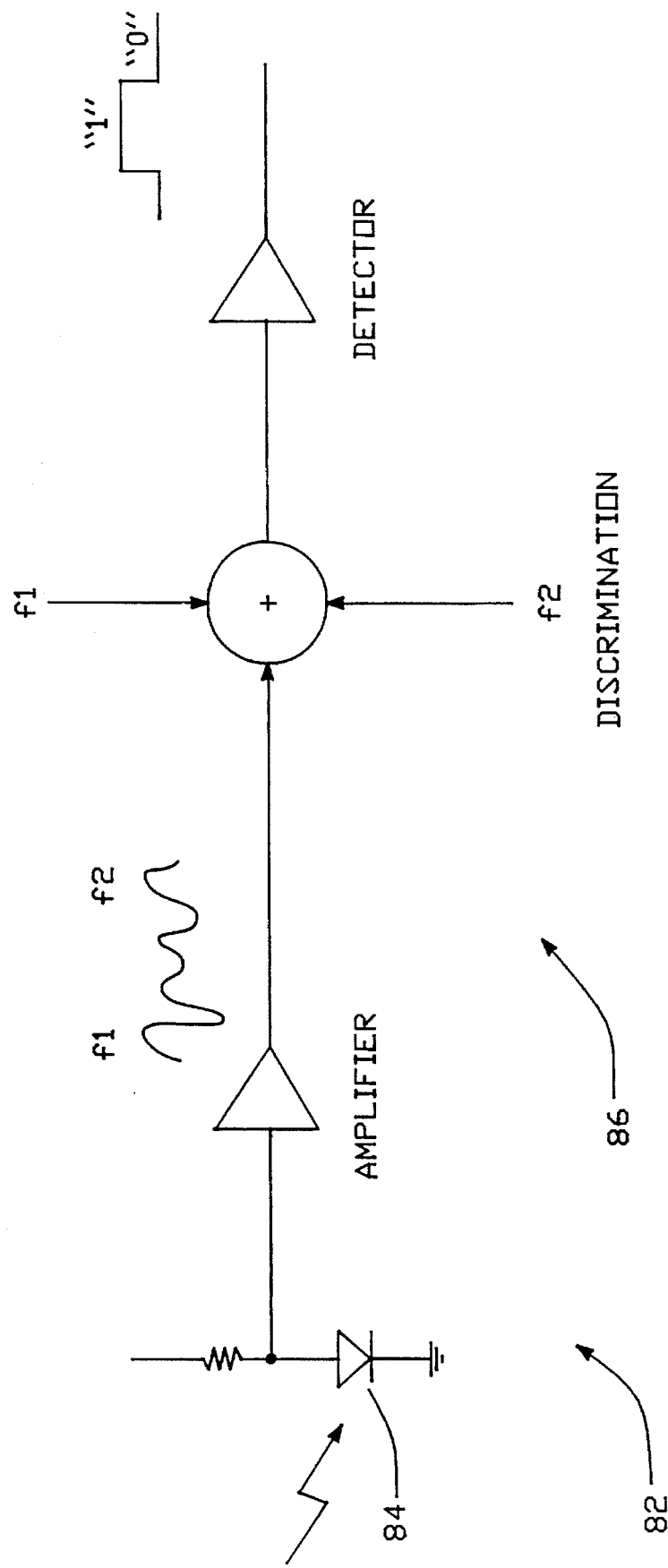
FIG. 7 depicts a schematical representation of the IR detector of the handheld device of the receiver of the system.

The IR receiver or detector 70 has a circuit 82 which consists of a photo diode 84 providing an electrical voltage proportional to the IR light level and a frequency discriminator 86 detecting the FSK modulation of the IR signal (FIG. 7).

The output of the photo detector 84 is amplified and shaped to provide a square wave with the frequency identical to the frequency of the IR signal. This frequency modulated signal is supplied to the frequency discriminator 86 tuned to the two frequencies used to transmit the IR data. This discriminator 86 recovers the serial data and supplies it to the microprocessor 72 of the handheld device 28.

The microprocessor 72 monitors the serial data transmitted via the IR link and builds a command stream from this data as defined in the below section describing the software structure of the invention. The commands create an operating program that implements an interactive program for the participant. The ROM of the microprocessor 72 contains the control program and command interpreter for the commands sent on the VBI. The RAM memory 74 stores the data and commands transmitted over the IR link representing the interactive program.

Figure 8:
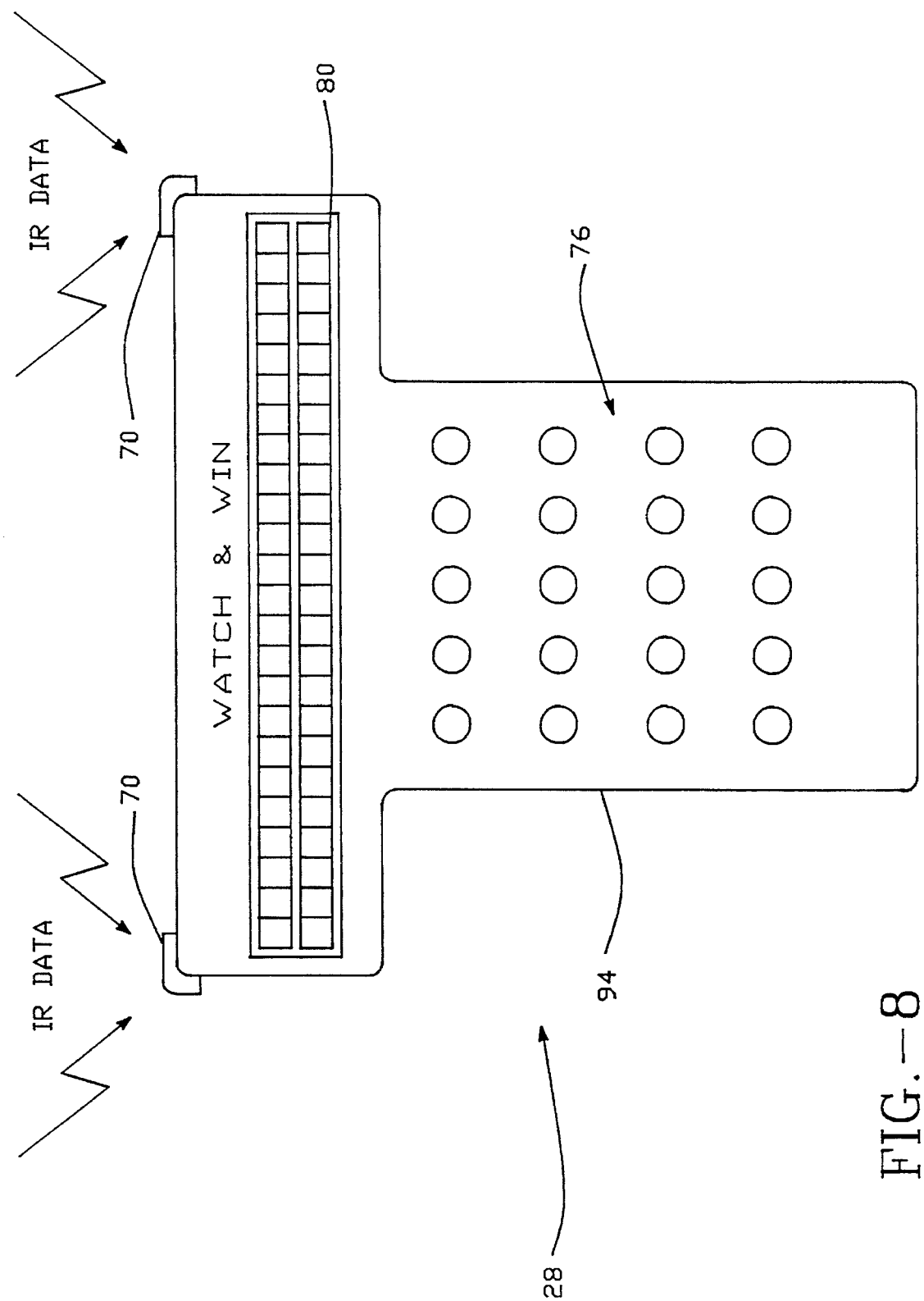
FIG. 8 depicts a top plan view of a "T" shaped handheld device of an embodiment of the invention of FIG. 1.

FIG. 8 shows an example for the "T" shaped case for the handheld device 28. Aspects of the outer housing 94 of the handheld device 28 include the following.

The case 94 is made from molded plastic of a strength and texture suitable for use by consumers in a household environment.

Figure 9:
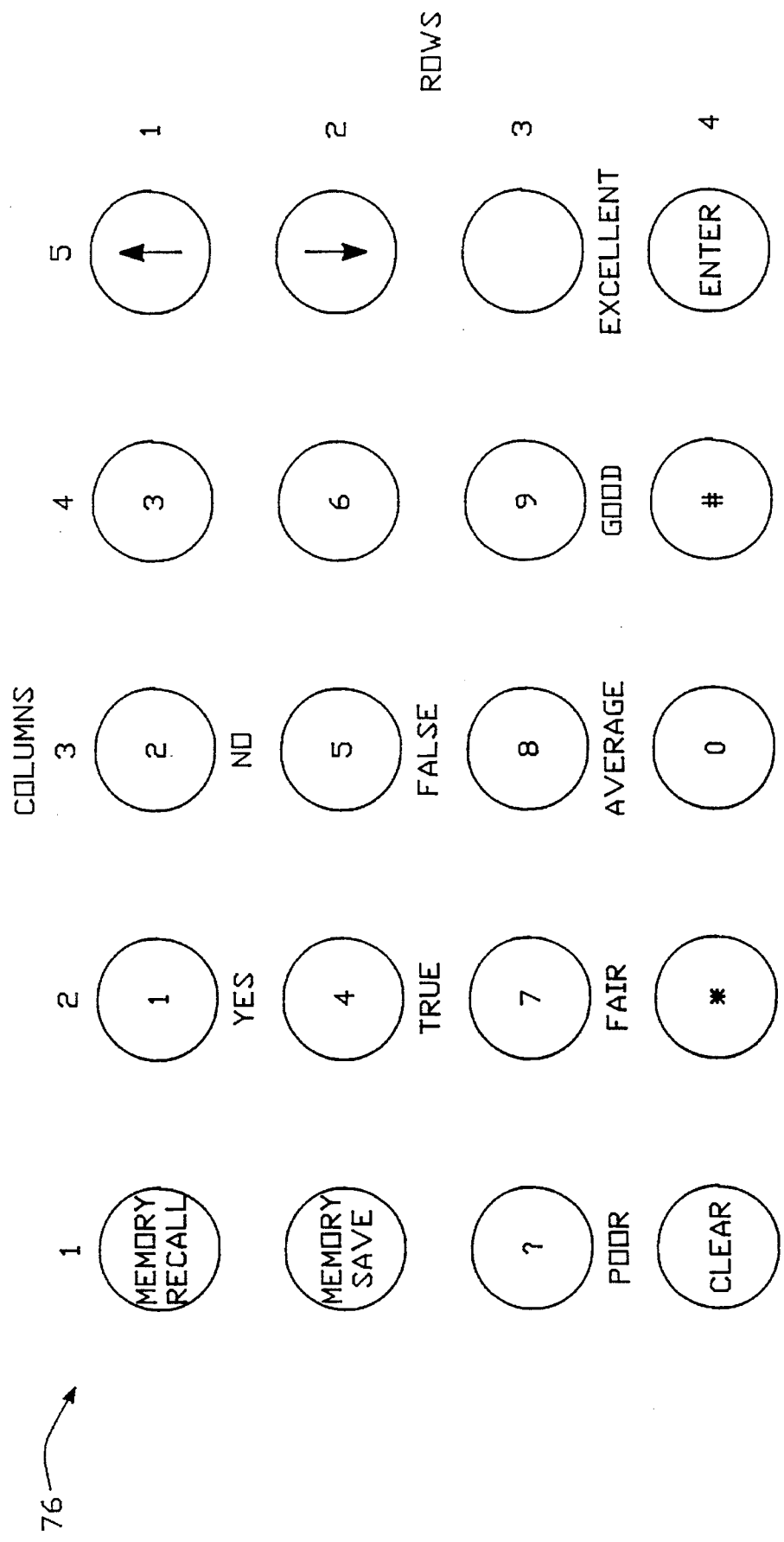
FIG. 9 depicts an embodiment of a keypad layout for the device of FIG. 8.

The keypad 76 should be a 1-piece molded rubber type with carbon contacts that make switch connections against a switch pattern on a printed circuit board (PCB). The words under nine of the keys (YES, NO, TRUE, FALSE, POOR, FAIR, AVERAGE, GOOD, EXCELLENT) are part of the plastic case 94 and not part of the keypad 76. The keypad 76 is arranged as four rows times five columns. FIG. 9 shows the arrangement and names all twenty keys.

The handheld device 28 derives power, in a preferred embodiment, from four 'AA' size cells that must be replaceable by the consumer via a removable door on the back of the unit.

The IR receiver 70 will have two windows of red tinted plastic that filter visible light in the front left and right corners of the case. IR receive circuitry will be mounted on the PCB behind both of these windows.

The "T" shape device 28 accommodates a relatively wide LCD display 80 (approximately four inches) and a relatively narrow keypad 76 into a package that can be either set on a table or held in a consumer's hand.

The microprocessor 72 includes, in a preferred embodiment, a Mitsubishi M38002M2-FP with 8K-bytes of internal ROM in a plastic quad flat pack package. The microprocessor 72 operates in a memory expansion mode at a crystal frequency of 5 MHz crystal.

The assignments of I/O pins to specific functions are shown in Table 1 below.

TABLE 1

MICROPROCESSOR I/O PIN ASSIGNMENTS

| PQFP PIN NUMBER | PIN NAME | DESCRIPTION |
| --- | --- | --- |
| 56 | P30 | Column 5 Keypad Scan Output |
| 3 | P60 | Column 4 Keypad Scan Output |
| 2 | P61 | Column 3 Keypad Scan Output |
| 1 | P62 | Column 2 Keypad Scan Output |
| 64 | P63 | Column 1 Keypad Scan Output |
| 63 | P64 | Row 4 Keypad Scan Input |
| 62 | P65 | Row 3 Keypad Scan Input |
| 61 | P66 | Row 2 Keypad Scan Input |
| 60 | P67 | Row 1 Keypad Scan Input |

TABLE 1-continued

MICROPROCESSOR I/O PIN ASSIGNMENTS

| PQFP PIN NUMBER | PIN NAME | DESCRIPTION |
| --- | --- | --- |
| 11 | INT2 | Active Low Keypad Key Hit Interrupt |
| 21 | P40 | Real-Time Data |
| 20 | P41 | Real-Time Output Enable |
| 10 | P51 | Real-Time Clock |
| 9 | P52 | Real-Time S1- |
| 8 | P53 | Real-Time S2- |
| 55 | P31 | LCD Contrast MSB |
| 58 | P71 | LCD Contrast |
| 59 | P70 | LCD Contrast LSB |
| 12 | SRDY- | Not Used |
| 14 | TXD | Not Used |
| 15 | RXD | Serial NRZ Data From IR Receiver |
| 17 | INT0 | Carrier Detect (Any Level) |
| 16 | INT1 | IR Data Clock (Rising Edge, Tie to SCLK) |
| 13 | SCLK | IR Data Clock (Rising Edge, Tie to INT1) |
| 4 | P57 | LCD Power Enable/Disable (ENABLE=0) |
| 5 | P56 | Low Battery Input |
| 6 | P55 | 32K-Byte Static RAM White Protect |
| 7 | P54 | Piezoelectric Speaker Output (Pulses) |
| 48 | AD0 | Address Bus 0 |
| 47 | AD1 | Address Bus 1 |
| 46 | AD2 | Address Bus 2 |
| 45 | AD3 | Address Bus 3 |
| 44 | AD4 | Address Bus 4 |
| 43 | AD5 | Address Bus 5 |
| 42 | AD6 | Address Bus 6 |
| 41 | AD7 | Address Bus 7 |
| 40 | AD8 | Address Bus 8 |
| 39 | AD9 | Address Bus 9 |
| 38 | AD10 | Address Bus 10 |
| 37 | AD11 | Address Bus 11 |
| 36 | AD12 | Address Bus 12 |
| 35 | AD13 | Address Bus 13 |
| 34 | AD14 | Address Bus 14 |
| 33 | AD15 | Address Bus 15 |
| 32 | DB0 | Data Bus 0 |
| 31 | DB1 | Data Bus 1 |
| 30 | DB2 | Data Bus 2 |
| 29 | DB3 | Data Bus 3 |
| 28 | DB4 | Data Bus 4 |
| 27 | DB5 | Data Bus 5 |
| 26 | DB6 | Data Bus 6 |
| 25 | DB7 | Data Bus 7 |
| 49 | RD- | Read Strobe to Static RAM |
| 50 | WR- | Write Strobe to Static RAM and LCD |
| 51 | SYNC | Not Used |
| 52 | PHI | Not Used |
| 53 | RESETOUT- | Not Used |
| 54 | ONW- | 1 Wait Stat for LCD |
| 22 | XIN | Connect 5MHZ Crystal |
| 23 | XOUT | Circuit Across XIN/XOUT |
| 19 | RESET- | Active Low Rest From Power Detect |
| 18 | CNVSS | Connect to VSS for Internal ROM |
| 24 | VSS | VSS from Battery − |
| 57 | VCC | VDD from Battery + |

The keypad 76 is scanned by the microprocessor using five outputs and four inputs. The four inputs are diode-or'ed together such that any keypress will produce an interrupt to the microprocessor. These active low interrupts occur when a key is pressed.

Figure 10:
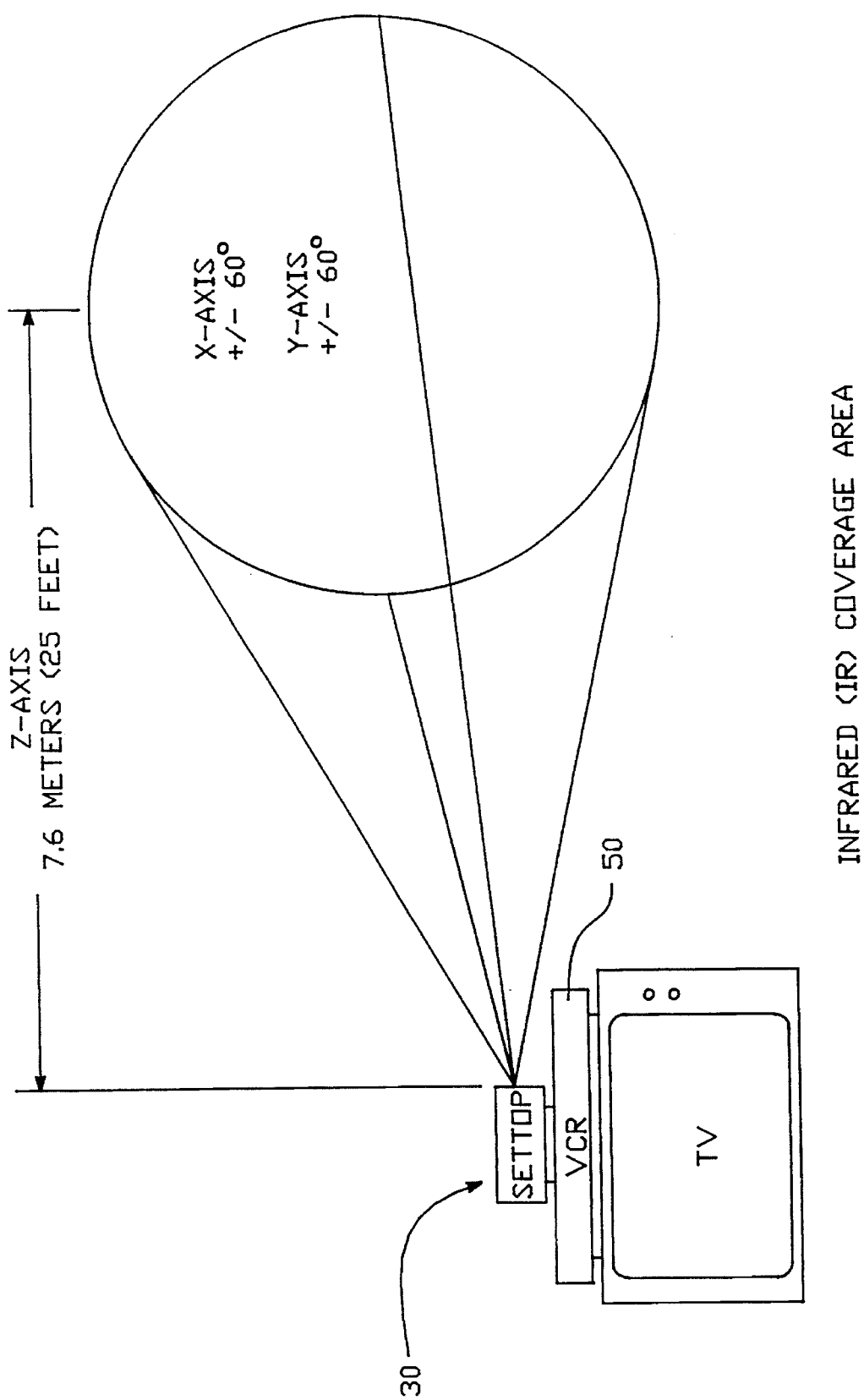
FIG. 10. depicts a representation of the IR coverage area for the invention of FIG. 1.

The handheld device 28 receives all remote data from the settop unit 30 via an infrared (IR) data link. The performance of this link must have a bit error rate less than one error for every 100,000-bits transmitted (random bit errors) when in the configuration shown in FIG. 10. In this configuration, the handheld receiver 28 is 7.6 m (25 feet) from the transmitter of the settop converter 30 and anywhere within plus or minus 60 degrees of the centerline of the transmitter.

Figure 4:
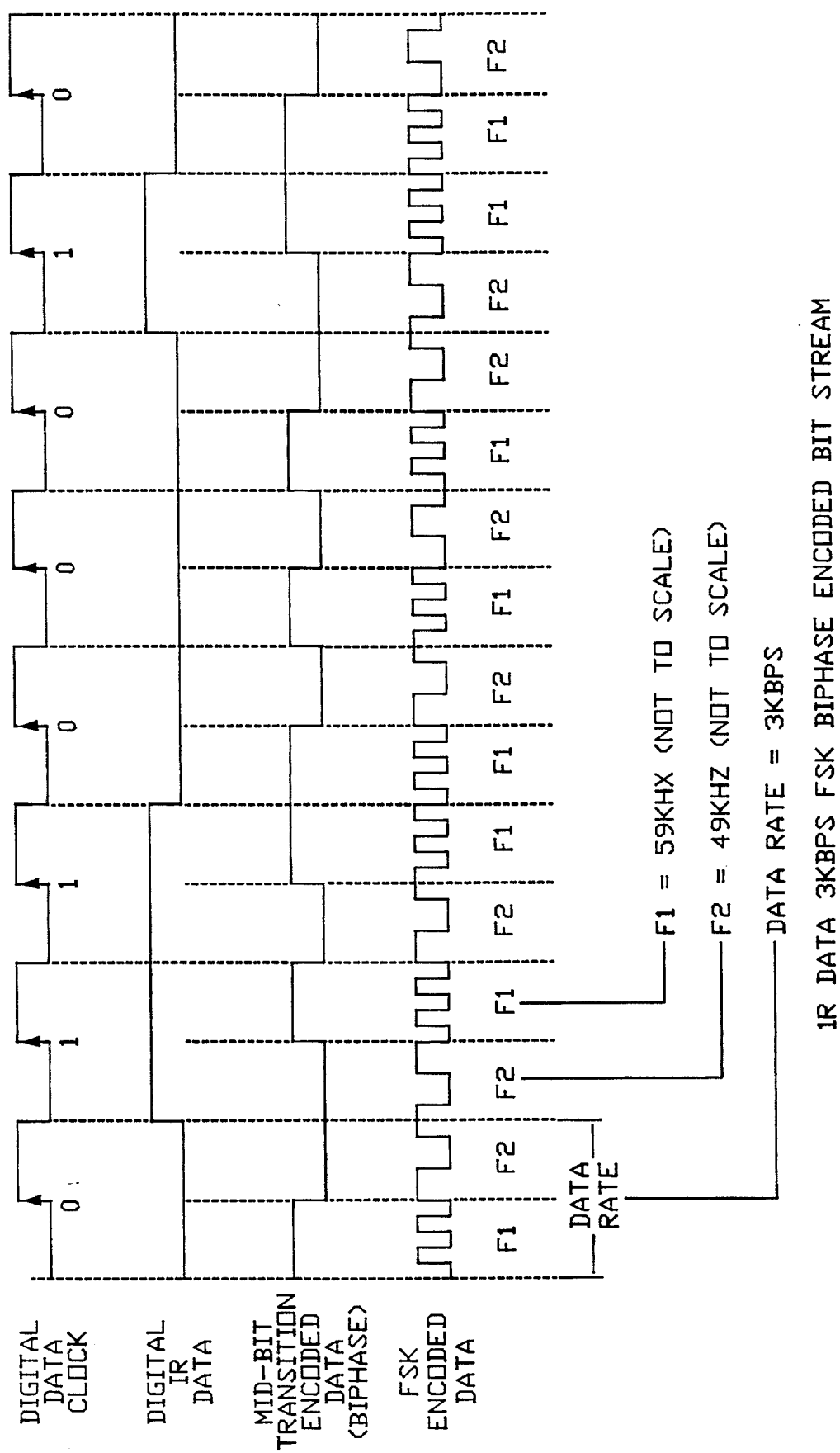
FIG. 4 depicts the IR data stream embodied as an FSK biphase encoded data stream.

As indicated above, the physical format of the IR data is an encoded FSK signal. The lower frequency is a 49 KHz and the upper frequency will be 59 KHz. The data rate is a 3000 bits/seconds (BPS). FIG. 4 shows the format of this data. The first line is the digital clock. The second line is the stream of digital IR data. The third line is the equivalent line mid-bit transition encoded data and the fourth lines shows the data FSK encoded. The FSK data is applied to the IR transmitting LEDs on the settop unit 30 and received by the diodes in the handheld device 28. The FSK data is decoded into mid-bit transition data, from which a clock is extracted and the data returned to the digital format. The microprocessor 72 uses the clock to shift the data into an internal serial port running in the synchronous mode. As indicated previously, the clock that is extracted as shown on the first line (FIG. 4) and is called the digital data clock.

To minimize power consumption, the IR receiver 70 should be preceded by a carrier detect (CD) filter 96 (FIG. 6). When energy in the 46–62 KHz range is detected then the carrier defect filter 96 is said to be active. This signal will actually switch power to the IR receiver with a VDD switch (a MOS transistor gate circuit in a preferred embodiment) which will remain powered while the IR data is received. After the IR data transmission from the settop unit 30 is complete the CD signal will go inactive and will remove power from the IR receiver 70. The CD filters 96 consumes as little current as possible since it is active all of the time. The logic level of the CD signal is a "don't care" for the microprocessor 72 and is chosen based on the lowest power consumption or cost of the CD circuit.

Figure 11:
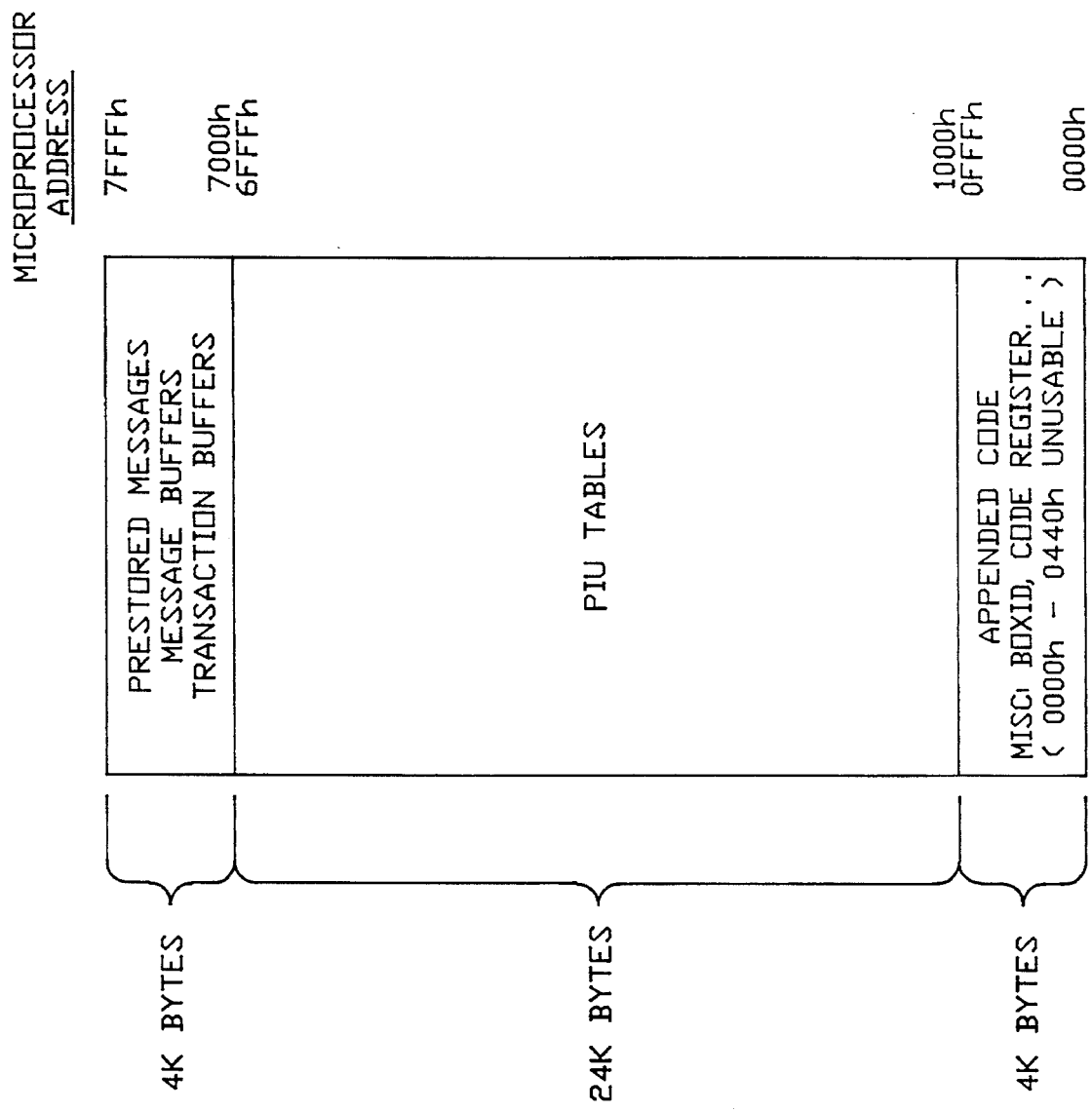
FIG. 11 depicts an embodiment of the memory map of the static RAM of an embodiment of the handheld terminal of the invention of FIG. 1.

Static RAM:

FIG. 11 shows the memory map of the 32K-byte static RAM 74. The static RAM 74 will be decoded into microprocessor addressees 0000h to 7FFFh. The first 400h locations of the external RAM 74 will be unused since these locations are internal to the microprocessor. The static RAM must run with zero wait states.

Figure 12:
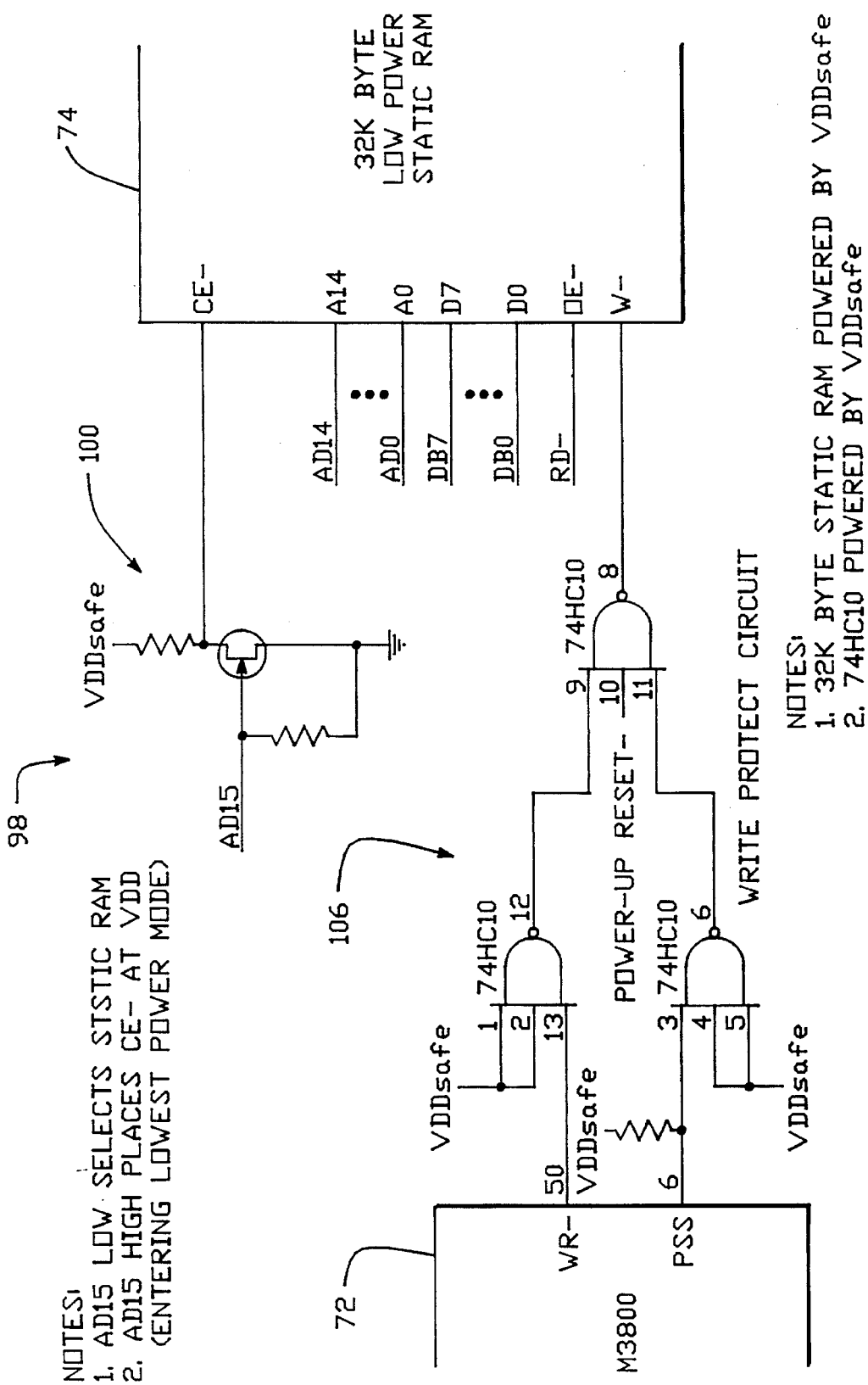
FIG. 12 depicts a schematical representation of the static RAM interface of an embodiment of the handheld terminal of the invention of FIG. 1.

FIG. 12 shows the 32K-byte static RAM interface 98. It is important that the chip select (CE-) pin of the RAM be higher than VDD-0.2 when not being accessed in order to be in the lowest power mode. This is the reason for the transistor circuit 100 at the CE- pin in FIG. 12. This extremely low power mode is found on the latest currently available versions of static RAM chips and results in a current draw of about 2 uA at room temperature.

The static RAM 74 chip (like the real-time clock) will be powered by the power fail detect circuitry 78 that changes over to the lithium coin cell 102 when loss of power from the main four 'AA' cells 104 is detected. This power is referred to as VDDsafe in FIG. 6.

The 32K-byte static RAM 74 has write protect circuitry 106 that requires the microprocessor 72 to place a logic low on an I/O pin before any write operation can be performed and will prevent false writes to the static RAM 74 during reset (which is active whenever VDD is invalid). The write protect circuit 106 is also powered by VDDsafe. It is noted that address bus lines AD14 and AD15 are pulled up to VDD for the memory address decoding to work properly.

The LCD display 80 is a two line by 24-character display with built in display RAM and character generator RAM. No backlight is used. The LCD display 80, in a preferred embodiment, shall conform to the features of the Sharp LM24255 (preprogrammed character generator ROM and eight character generator RAM locations).

The LCD display is mapped into memory at microprocessor addresses 8000h (control register) and 8001h (data register). The timing of the typical LCD display 80 module indicates that one wait state may be required during accesses and the microprocessor ONW-line is appropriately controlled to accomplish this task (see Table 1).

To allow the microprocessor to control the LCD contrast in software a R/2R ladder network is to be implemented using three I/O bits of the microprocessor (see, Table 1).

The LCD design does not have a low power mode. To extend battery life, the LCD power must be controlled by an I/O bit from the microprocessor. FIG. 6 shows this as a VDD switch 108. This can be, in a preferred embodiment, a MOS transistor gate circuit that will allow power to the LCD when the microprocessor control signal is low.

The Epson RTC-4503 chip is the preferred real-time clock 78. It is connected to the microprocessor 72 with I/O pins. The real-time clock 76 (like the static RAM 74) is powered by the power fail detect circuitry that will change over to the lithium coin cell 102 when loss of power from the main four 'AA' cells 104 is detected. This power is referred to as VDDsafe above.

The piezoelectric speaker 88 will produce musical tunes and tones. The frequency response of this unit is within the range of 1 KHz or below on the low end and 5 Khz or above in the high end. Within this range, the sound pressure output of the piezo is level. The sound pressure level output should be in the range of 20 dB to 30 dB.

The speaker 88 is driven by one of the timer outputs of the microprocessor 72 running in the pulse output mode.

The preferred main source of power is four 'AA' cells 104. There is an additional three volt lithium coin cell 102 that powers the 32K-byte static RAM 74, write protect circuitry 110, and the real-time clock 78 when loss of main power is detected since these must remain powered at all times. Main power is lost when the four 'AA' cells are either drained below minimum working voltage or are removed entirely. The power derived only from the main batteries is referred to as VDD. The power that is output from the power fail detect circuitry that is powered by the three volt lithium coin cell is referred to as VDDsafe as indicated above.

Software Structure

The features of a particular interactive program are implemented in part in software resident in the handheld terminal 28. This software performs two functions. The first function is to build a short interactive program from high level commands transmitted via the IR link. After the program has been transmitted and verified by a CRC error check, the software enables the program to be executed. The second function is the execution of the program. Each independent program that is transmitted and executed is called a transaction. A typical transaction would consist of a sequence of a question asking for a response from the participant followed by a test of the response resulting in a score.

During the time that the participant is responding to the transaction, the next transaction is being received and made ready for the participant to process. Using this approach, the amount of information transmitted via the network prior to a participant being able to use the handheld device 28 is essentially transparent to the user compared to other prior interactive devices.

Timed responses where the participant must react within a specific time interval is controlled either by a countdown timer implemented with the microprocessor 72 within the handheld terminal 28 or via a new transaction being sent and activated before the participant enters the response to the prior question.

For a question where the viewer has a predetermined amount of time to provide an answer, the input command requesting the answer includes a time in seconds that the handheld device 28 waits for user input.

After completing an interactive game, a resulting score is encoded with the program code and a box serial ID number to establish an authorization number unique for the viewer. Using a touch tone telephone, the viewer may enter their results for prizes or recognition.

Data Transmitted via the IR Link:

The interactive programs and messages are transmitted over the IR link in a data format structured as a packet containing all of the interactive commands required for a participant to use the handheld device 28. The structure of this packet is as follows:

| Sync | 3-bytes of all ones |
|---|---|
| Packet ID | 3-bytes |
| Packet Count | 2-byte |
| Command 1 | |
| | Interactive Program |
| Command i | |
| CRC | 2-bytes |
| End of Frame | 3-bytes of all ones |

The sync block and end of frame block are three-bytes with a bit pattern that is unique within the packet. This approach clearly defines the start and end of each packet.

The packet ID consists of 24-bits (3-bytes) with the bits segmented into a programmer ID of 9-bits, a program ID of 12-bits, and a PIU slot address of 3-bits.

The PIU table (200 of which are located in RAM 74) where data is stored corresponds to an unique PIU code. Each programmer as defined by the programmer ID has a specified number of tables available for their use. The PIU slot address defines which table within the programmer's set of table may be used by the interactive program.

The software process within the handheld device 28 consists of the packet being received correctly over the IR link. The programmer ID and the slot address is used to select a PIU table. If a table does not exist with the same programmer ID and slot address, a new table is created. If the table exists and the programmer ID is the same for the new transaction compared to the stored ID in the table, the old values in the table are kept and the interactive commands transmitted within the packet are processed. If the new program ID of the table are different, the table values are erased before processing the packet.

The command structure is encrypted using a conventional FEC algorithm with one half rate coding to improve data transmission reliability. It is also encrypted using a key ranging up to 56-bits. Within the handheld device 28, a total of three keys are stored. A command to modify the third key is defined and is available for changing the key in the event the three keys become known.

Interactive Software Commands:

In order to reduce the time required to send an interactive program via the IR link, a high level interactive language was invented. This concept reduces the amount of data that must be transmitted to a few powerful commands. The specific order and collection of these commands within the packet determine the interactive program. The user's response to these commands implement the interactive program.

An interactive program consists of one or more packets of commands that are sent via the IR link and processed by the control program of the handheld device 28. Each handheld device 28 contains the interactive program transmitted via the IR link and can generate a score or response unique to the individual participant.

| Copyright ® 1991 Watch & Win: | |
|---|---|
| COMMANDS | The handheld device implements transactions, events, and PIUs through interpreting a set of commands inserted by programmers at the insertion system 22 and transmitted over the data path by, for example, broadcast signals, to decoding system 24. These commands are created by the programmer using a software package provided with the insertion system 22. The following commands represent the main types of functions that are implemented. Table 2 attached, includes a further list of commands |
| Display (msg) | The meaages is displayed on the LCD and remains on the LCD display until one of the following conditions or events occurs: Another message is processed. The Recall button is pressed. Other special massages are displayed if the appropriate button is pressed. No data is transmitted to the handheld within 15 seconds and the viewer has not pressed any buttons (at which time the handheld device powers down). If the viewer attempts an invalid input, the display does not change. |
| Input (msg) | The message is displayed and the unit waits for input as described below; A time delay INPUT (msg, counter) request is one where the amount of time in seconds is transmitted along with the input command. For timed input, while waiting for the counter to reach zero, the two (or three) digit time value is displayed in the bottom right two (or three) screen display characters. If the counter times out before any input by the viewer, the handheld device displays MSG1. An open ended INPUT (msg) request is one where the unit waits for input until the next transaction is received. If the viewer provides a response after the next transaction is received, the response is ignored and the transaction containing the INPUT command is flushed from the unit. Alternatively, the last response could be interpreted as a response to the next subsequent transaction. The handheld device waits until the enter key is pressed before procesing the response. The number of keys entered from the keyboard can be limited by the field width variable. If the |

-continued

Copyright ® 1991 Watch & Win:

|  |  |
|---|---|
| | field width is one, then an enter key is not needed to terminate an input response. If the Timeout variable is not zero, then the input command will be timed. If the timer expires, the command will automatically terminate and the input response ignored.<br>Example:<br>INPUT "How much are you willing to bet?", 3, 33<br>[OPCODE] [Field Width] [X Offset] [String] [Null]<br>INPUT "How much are you willing to bet?", 3, 33, 10<br>[OPCODE] [Field Width] [X Offset] [Timeout] [String] [Null] |
| Range (x,y) | Associated with the INPUT command prescribing the range of acceptable key inputs that is the range of value that are acceptable as answers. When the viewer response is detected, the unit confirms that the response is within the range and processes the next command within the transaction.<br>If the responmse is not between "x" and "y" values, the unit displays MSG2 and waits for a new input. If the second response is still not within the range, the unit displays MSG3, clears the input buffer and processes the next command.<br>Example:<br>RANGE T0, T1<br>[OPCODE] [LOW REGISTER] [HIGH REGISTER] (3-bytes)<br>RANGE 1, 2<br>[OPCODE] [LOW VALUE] [HIGH VALUE] (9-bytes) |
| Add (x,y) | The programmer can add the value in location x to the value in location y, where the sum is stored in location y. |
| Sub (x,y) | The programmer can subtract the value in location x from the value in location y, where the result is stored in location y. |
| Save (x,y) | The programmer can save the value in location x (or a value itself) in location y. The previous value in location y is lost. |
| CONDITIONAL:<br>If, Then,<br>And, Or<br>And, Or | The programmer can establish logic and arithmetic function using >, <, >=, <= or = as a test of either keyed input, stored responses, or stored scores to do other logic steps. A typical example is as follows:<br>Example:<br>IF TSCORE > THEN DISPLAY "Good Work?"<br>IF (RESP 1 == T0) THEN<br>[OPCODE] [Operator] [Operand A] [Operand B] [True Offset] [False Offset]<br>IF (RESP 1 == T0 and (RESP 2 == T1) THEN [OPCODE] [# of Op's] [Op] [Op$_1$] [OP$_2$] [Op] [Op$_3$] [OP$_4$] [Op] [True Offset] [False Offset] |
| Else | Used a part of IF statement to signify alternative processing for, as an example, wrong INPUT responses. |
| Beep (x,y,z) | This will generate an audio sound from the handheld device 28, where x is the number of beeps, y is the duration in seconds of each beep, and z is the number of seconds between each beep. |
| Shift (x,y) | This command is used to indicate a multiplication desired by the programmer. The value in location y can be multiplied by 2(x=1), 4(x=2), 8(x=3), or 16(x=4). |

-continued

Copyright ® 1991 Watch & Win:

|  |  |
|---|---|
| Repeat (msg x,y,z) | A command which results in multiple DISPLAY and other logic commands being sent to the logic device 28. Using REPEAT, the programmer can request that a message be displayed on the handheld device 28 every x minutes, that the message be sent to the handheld device 28 every y minutes, and that the message stop being displayed after z minutes. |
| Hold (x) | A command sent to and used by the data inserter 38 which tells us the inserter 38 not to insert any background information on line x until the line is released using a RELEASE command. |
| Release (x) | A command sent to and used by the data inserter 38 which tells the inserter 38 that it is OK to insert background commands on line x. |
| Delete (PID) | This is a command used to delete the PIU table from non-voltage memory to make room for new PIUs. A background task of sending a group of DELETE commands for known completed PIUs will be initiated when it is detected that PIUs have not been deleted normally.<br>Example:<br>DELETE PID NUMBER<br>[OPCODE] [PID NUMBER] (4-bytes) |
| Prestore (msg, MSGx) | Stores a standard message in message buffer of non-voltage memory in the handheld device 28, in location MSGx (MSG5 – MSG10 are still available). A DISPLAY command can either designate that a free form message or a prestored message be displayed on the screen.<br>Example:<br>PRESTORE 5, "Please try again."<br>[OPCODE] [MSG#] [STRING] [NULL] |
| Disable (boxid) | Reset the handheld device 28 to its uninitialized state.<br>Example:<br>DISABLE 12345678<br>[OPCODE] [BOX ID] (5-bytes) |
| Appendcode | The command to add a new block of assembly level (exentable) code to the memory in the handheld device 28. |
| DEFINE NEW ADDRESS KEY: | This Opcode will load a new address key to be used to descramble the next program segment to be executed.<br>Example:<br>KEY 1234<br>[OPCODE] [KEY] (3-Bytes) |
| UN-<br>CONDITIONAL<br>BRANCH | This Opcode is used to transfer program execution to a different Opcode within the program.<br>Example:<br>GO TO LABEL<br>[OPCODE] [16-Bit 2's Comp. Offset] (3-bytes) |
| EXIT: | Used to signal the software for the handheld device 28 that the current program is finished.<br>Example:<br>EXIT<br>[OPCODE] (1-byte) |

Table 3 presents a list of prestored messages.

SOFTWARE REGISTERS RESIDENT
IN HANDHELD DEVICE 28

| | |
|---|---|
| PIU TRANSACTOR REGISTERS | 200 PIU tables are used by the software to store user responses and game scores. The transaction register contents are |

-continued

SOFTWARE REGISTERS RESIDENT
IN HANDHELD DEVICE 28

|  | maintained until a program deletes the PIU table or the registers are used by another program. The registers defined in each table are: |
|---|---|
|  | PID — Programmer ID Number |
|  | Flag — Programmable Flag Register |
|  | Score 1 — Event Score Register |
|  | Score 2 — Event Score Register |
|  | Score 3 — Event Score Register |
|  | RESP1 — User Response Register |
|  | RESP2 — User Response Register |
|  | RESP3 — User Response Register |
|  | REGISTER 1 — Program Storage Register |
|  | REGISTER 2 — Program Storage Register |
|  | REGISTER 3 — Program Storage Register |
|  | REGISTER 4 — Program Storagr Register |
|  | Counter — Elapsed Timer for Viewer Response |
| SCRATCH PAD REGISTERS | Scratch pad registers are used by the program for temporary storage. The value of each register is cleared at the start of each program. There are 16, 32-bit registers available. |
| DATE/TIME REGISTERS | Used to verify program execution Date and Time. Registers available for program use are: Minute Hour Day Month Year |
| BOX ID REGISTER | A four-byte register that contains a unique set of numbers for each handheld device 28. |
| CODE REGISTER | A four-byte register stored in non-volatile memory for global program usage |

Table 4 presents an example of interactive games that can be played with this system.

INDUSTRIAL APPLICABILITY

The operation of the transaction based interactive television system 20 of the invention is as follows:

In a preferred embodiment, at the programming or source end of the system, an event such as, for example, a sports event, a quiz show or an educational presentation is mated with interactive data in order to associate a series of inquiries and response with the event. The series of queries and responses are, in a preferred embodiment, inserted into the designated lines of the vertical blanking interval much as closed captioning signals are inserted in the VBI. Thus, the standard NTSC signal carries the traditional programming in addition to encoded data of the present invention. This signal is then communicated by broadcasts, satellite, cable, microwave or telephone lines, and any combination thereof to remote user's which have a VCR or television receiver, television monitor and the proprietary handheld device 28 of the present invention. As the signals are encoded in the vertical blanking interval, such signals are not apparent to standard viewer at a remote location without a proprietary decoding system 24, which includes the handheld device 28 and the settop decoder 30. Thus, the NTSC signal is received without the viewer knowing or being disturbed by any other signals of the present invention. With the decoding system 24, the viewer is able to receive, decode, and thus interact with the presentation on the television screen.

In much the same way as closed caption VBI decoders work, the settop decoder 30 detects the proprietary programming data recorded on the lines in the vertical blanking interval and decodes this data. The data is then transmitted through an infrared transmitter to a handheld device 28 which has infrared detectors. This signal once detected by the handheld device 28 is then used to initiate functions of the handheld device 28. Principal among these functions are the display of messages of the LCD display 80 and the creating and updating of the PIU tables which are associated with each transaction of the event.

Thus, the proprietary high level command language transmitted in conjunction with the standard television broadcast signal is used to activate the handheld device 28. This command language is used to cause the executable code also sent over the VBI to fill in the PIU tables stored in the handheld device in order to update and create new transactions, to perform the various message functions of the handheld device, and to initiate the various transactions. Such an arrangement eliminates the need for the viewer (1) to wait for the downloading of main programs and (2) to be tuned to the appropriate stations before the game begins in order to obtain the entire game program.

The high level proprietary language affords commands and also allows for a rapid delivery of executable code which resides in the PIU tables. Each programmer or program creator at the PIU insertion system 24 would have its own program or ID number and the ID number of a number of PIU tables. Thus, the programmer can insert, at any time, in the VBI new information needs to go into the PIU table. As explained above, each PIU table includes a transaction for at least one response to an interactive inquiry from the programmer. Each of these transactions can be associated with a different game or event occuring throughout the programming and a number of these transactions or PIU tables can be linked together in order to create a series of continuous interactive transactions throughout an interactive session. For example, in the situation of a commercial broadcast of a live sports event with interleaved commercials, a number of PIU tables can be associated together to present interactivity throughout the length of the sports event. Further interleaved with the activity of the main sports event, the various commercials can each be assigned their own PIU table and interleaved throughout the main interactive event. Thus, the viewer can interact with the transactions of the main event and also interact with the transactions of each of the separate commercial events and have all the scores and responses recorded.

It is noted from the above that the implementation of the PIU tables breaks down the games and events into individual transactions. These tables can be quickly created from information encoded on the VBI. Tables as indicated above, are identified with a programmer ID. The tables are maintained in, for example, the static RAM as long as need. Should the games change, the programmer simply sends a new signal in order to reprogram that location in the static RAM. In the present embodiment there are several hundred tables, and each is capable of allowing the user to play a game. Thus for a game on a commercial, each game would have its own PIU table and main game played with the main feature may have a multiplicity of PIU tables.

It follows from the above that the present embodiment allows the viewer to come in at any time during the program and immediately begin to play games or otherwise interact with the television and also to "graze" or switch between several stations and immediately be able to play or interact with each channel. This is an improvement over the prior art devices which require that only one game at a time be played, that the user wait for the information to be downloaded to the system, and that does not allow for the interleaving of various games. Further, prior art devices cannot allow the viewer to begin or leave the game at any point in time and have the score for the portion of the game played recorded.

Even with interleaved games and with viewer's coming and leaving the screen at various times, the viewer's reactions and answers to all games in which the viewer participates are stored by the system and later reported to a central processing station.

Finally, after the events are concluded, the viewer will receive a score or scores from the handheld device 28. The score is encoded along with, for example, the user identification number and the identification number of the handheld device 28. The viewer can then telephone a central processing station and with the use of a touch tone telephone key in the score and the identification information received from the handheld device 28.

It is further to be understood that the present system can be encrypted using encryption algorithms and keys as is known in the trade. The handheld device 28 would thus store, for example, three keys at least one of which could be reprogrammed by a signal sent on the VBI.

It should also be appreciated that with the present system that a series of events can be linked together. For example, the system can afford the viewer the ability to participate in an interactive event which strings together the four or more games of a world series baseball event. That is to say that the viewer is asked to the pick the winner of each of the games of a world series and the winner of the world series. This information could be stored in the handheld device 28 over a period of days or longer if necessary for other games and then checked against the actual outcome of the individual games and series. The user's score over a period of time could then be encoded and then reported back to the central station by the users.

Other aspects and embodiments of the present invention can be viewed from a view of the figures and a review of the claims.

It is to be understood that other embodiments of the present invention could be configured and come within scope and spirit of the appended claims.

Copyright 1991 Watch & Win

COMMAND CODE

TABLE 2

COMMAND CODE
Instruction Set Summary

| Mnemonic | Description | Bytes | Opcode |
|---|---|---|---|
| ADD | Add direct | 3 | 80h |
| ADDI | Add immediate | 6 | 90h |
| AND | And direct | 3 | 81h |
| ANDI | And immediate | 6 | 91h |
| BEEP | Beep direct | 2 | 71h |
| BEEPI | Beep immediate | 4 | 70h |
| CLR | Clear register | 2 | 20h |
| DISABLE | Dosable handheld | 5 | A4h |
| DISPLAY | Display formatted text | * | A5h |
| DIV | Divide immediate | 3 | 82h |
| DIVI | Divide immediate | 6 | 92h |
| DPT | Delete PIU table | 4 | A0h |

TABLE 2-continued

COMMAND CODE
Instruction Set Summary

| Mnemonic | Description | Bytes | Opcode |
|---|---|---|---|
| EXIT | Terminate program | 1 | A2h |
| GOTO | Unconditional branch | 3 | A7h |
| IF | Conditional branch | 8/13 | A9h |
| INPUT | Input user response | *** | 50h |
| KEY | Define new description key | 3 | A3h |
| LOCK | Lock out user input | 1 | A8h |
| MOD | Calculate remainder | 3 | 83h |
| MODI | Calculate remainder immediate | 6 | 93h |
| MOV | Load register | 3 | 84h |
| MOVI | Load register immediate | 6 | 94h |
| MPY | Multiply direct | 3 | 85h |
| MPYI | Multiply immediate | 6 | 95h |
| OR | Or direct | 3 | 86h |
| ORI | Or immediate | 6 | 96h |
| PRESTORE | Store display string | ** | A6h |
| RNG | Define input range | 3 | 8Bh |
| RNGI | Define input range immediate | 9 | A1h |
| RSTF | Reset bit, PIU flag register | 1 | 1Xh |
| SETF | Set bit, PIU flag register | 1 | 1Xh |
| SHL | Shift left direct | 3 | 87h |
| SHLI | Shift left immediate | 6 | 97h |
| SHR | Shift right | 3 | 88h |
| SHRI | Shift right immediate | 6 | 98h |
| SUB | Subtract direct | 3 | 89h |
| SUBI | Subtract immediate | 6 | 99h |
| TIME | Verify real time | 5 | 60h |
| XOR | Exclusive-OR direct | 3 | 8Ah |
| XORI | Exclusive-OR immediate | 6 | 9Ah |

*The number of bytes for the display command is the string length plus one.
**The number of bytes for the prestore command is the string length plus two.
***The number of bytes for the input command is the string length plus four or seven.

| | 1 ADD add registers |
|---|---|
| Description | The contents of the destination register are added to the contents of the source register and the result is stored in the destination register. |
| Execution | Rd <– Rd + Rs |
| Encoding | [80h][Rd][Rs] (3 Bytes) |
| Script example | T0 = T0 + T1 |
| | Before Instruction    After Instruction |
| | T0 – 100            T0 – 120 |
| | T1 – 20             T1 – 20 |
| | 2 ADDI add immediate value to register |
| Description | The contents of the designation register are added with a 32 bit immediate value and the result is stored in the destination register. |
| Execution | Rd <– Rd + Value |
| Encoding | [90h][Rd][Value] (6 Bytes) |
| Script example | T0 = T0 + 100 |
| | Before Instruction    After Instruction |
| | T0 – 100            T0 – 200 |
| | 3 AND and registers |
| Description | The contents of the destination register are anded with the contents of the source register and the result is stored in the destination register. |
| Execution | Rd <– Rd AND Rs |
| Encoding | [81h][Rd][Rs] (3 Bytes) |
| Script example | T0 = T0 AND T1 |
| | Before Instruction    After Instruction |
| | T0 – 0F000h      T0 – 8000h |
| | T1 – 7000h       T1 – 7000h |
| | 4 ANDI and register with immediate value |
| Description | The contents of the destination register are |

|  |  |
|---|---|
| Execution | Rd ← Rd AND Value |
| Encoding | [91h][Rd][Value] (6 Bytes) |
| Script example | T0 = T0 AND 8000h |
|  | Before Instruction    After Instruction |
|  | T0 – 0C00h    T0 – 4000h |

5 BEEP produce an audible tone

| | |
|---|---|
| Description | BEEP is exactly the same function as BEEPI except that the information used to produce the tone is stored in ROM and is referenced by the operand specified in this command. There are three predefined tones of one, two or three beeps with a duration of 500mS and a period of 500mS. If the refernce operand is out of the range of 1-3, this command will be ignored. |
| Execution | SFLAG ← 1 |
| | NBEEPS ← BEEP[REF].NBEEPS |
| | NDUR ← BEEP[REF].NDUR |
| | NPER ← BEEP[REF].NPER |
| Encoding | [71h][Reference Beep] (2 Bytes) |
| Script example | BEEP 2 |
| | Produces two tones, 500mS apart, for a duration of 500mS for each tone. |

6 BEEPI produce an audible tone

| | |
|---|---|
| Description | BEEPI is used to produce an audible tone from the handheld terminal. Once this command is executed, the beep function will operate in the background allowing other instructions to be executed. There are two ways the beep function is terminated. First, the number of beeps specified in the command has expired; or second, a new program transaction has been received and execution of that program has started. The duration and period operands are defined to be 100mS units of time, with a maximum time value of 25.5 seconds. |
| Execution | SFLAG ← 1 |
| | NBEEPS ← Operand #1 |
| | NDUR ← Operand #2 |
| | NPER ← Operand #3 |
| Encoding | [70h][NBEEPS][NDUR][NPER] (4 Bytes) |
| Script example | BEEPI 2, 5, 5 |
| | Produces two tones, 500mS apart, for a duration of 500mS for each tone. |

7 CLR clear register

| | |
|---|---|
| Description | The contents of the destination register is reset to zero. |
| Execution | Rd ← 0 |
| Encoding | [20h][Rd] (2 Bytes) |
| Script Example | T0 = 0 |
| | Before Instruction    After Instruction |
| | T0 – 100    T0 – 0 |

8 DISABLE disables handheld terminal

| | |
|---|---|
| Description | When this command is executed, the handheld terminal will be set to the uninitialized state. The unit will no longer respond to the IR receiver or keyboard input from the user except in the access control mode to reinitialize the handheld terminal. |
| Execution | IFLAG ← 0 |
| Encoding | [0A4h][Box Id] (5 Bytes) |
| Script Example | DISABLE 12345678 |
| | Before Instruction    After Instruction |
| | IFLAG – 1    IFLAG – 0 |

9 DISPLAY write formatted text to the display

| | |
|---|---|
| Description | Display accepts a series of plain characters and delimiters in the string and outputs the formatted string to the display screen. The plain characters are copied verbatim to the display screen and the delimiters are used to specify the insertion of prestored strings, variables, end of display lines and end of display strings. |
| Delimiters | NULL: Used to signify the end of a display string. When this character is encountered in the string, the formatted display string is transferred to the sixteen screen message buffer and becomes the active display message in the buffer. The encoded byte value for the NULL character is 0. |
| | VARIABLE: Used to signify that an internal register value will be inserted into the formatted text string. The VARIABLE delimiter is composed of the delimiter, register number to be displayed and the format specifier. The encoded byte value for the VARIABLE character is 01h, followed by the register number and the format specifier. A total of three bytes are needed to define this delimiter. The format specifier is composed of a four bit field defining the field width and a four bit field defining the field format. The field width is located in the upper nibble of the byte and specifies a field width of 1-15 characters. Refer to the table below for the definition of the field format located in the lower nibble. |
| | 0 - Left justified integer |
| | 1 - Right justified integer, blank padded |
| | 2 - Right justified integer, zero padded |
| | 3 - Reserved |
| | 4 - Left justified fixed point integer |
| | 5 - Right justified fixed point integer, blank padded |
| | 6 - Right justified fixed point integer, zero padded |
| | 7-15 Reserved |
| | MESSAGE: Used to insert any of the prestored messages available in ROM or non-voltile memory. When this delimiter is encountered, the current display line will be terminated and padded to 24 characters, if needed, and the prestored message specified will be inserted on the following display lines. The encoded byte value for the MESSAGE character is 02h, followed by the prestored message number. A total of two bytes are needed to define this delimiter. |
| | CR: Used to signify the end of a display line. If 24 characters where not speicifed for the current display line, the remainder of the display line will automatically be padded with blanks. The encoded byte value for the CR characaters is 0Dh. |
| Encoding | [0A5h][String] |
| Script Example | DISPLAY "Thanks for playing! Tune in & play again soon!" |
| | Display Screen |
| | Line 1 - Thanks for playing! Tune |
| | Line 2 - in & play again soon! |
| | DISPLAY "To get poll results,\rpress 'Yes' now." |
| | Display Screen |
| | Line 1 - To get poll results, |
| | Line 2 - press 'Yes' now. |
| | DISPLAY "You have %i points.\rGreat work!", |
| | TSCORE |
| | Display Screen |
| | Line 1 - You have 20 points. |
| | Line 2 - Great work! |

10 DIV divide registers

| | |
|---|---|
| Description | The contents of the destination register are divided by the contents of the source register and the quotient is stored in the destination register. |
| Execution | Rd ← Rd/Rs |

| | | |
|---|---|---|
| Encoding | [82h][Rd][Rs] (3 Bytes) | |
| Script Example | T0 = T0/T1 | |
| | Before Instruction | After Instruction |
| | T0 – 113 | T0 – 11 |
| | T1 – 10 | T1 – 10 |

11 DIVI divcide register by an immediate value

| | |
|---|---|
| Description | The contents of the destination register are divided by a 32 bit immediate value and the quotient is stored in the destination register. |
| Execution | Rd <– Rd/Value |
| Encoding | [92h][Rd][Value] (6 Bytes) |
| Script Example | T0 = T0/20 |

| | Before Instruction | After Instruction |
|---|---|---|
| | T0 – 201 | T0 – 10 |

12 DPT delete PIU table

| | |
|---|---|
| Description | Deletes a PIU table from non-volatile memory allowing a different program to use that PIU table. All of the values in the PIU table are cleared. |
| Execution | PIU[PID] <– 0 |
| Encoding | [0A0h][PID Number] (4 Bytes) |
| Script Example | DELETE 112233 |

| Before Instruction | After Instruction |
|---|---|
| PIU Table | PIU Table |
| PID – 112233 | PID – 0 |
| ESCORE – 10 | ESCORE – 0 |
| PSCORE – 0 | PSCORE – 0 |
| TSCORE – 20 | TSCORE – 0 |
| RESP1 – 1 | RESP1 – 0 |
| RESP2 – 0 | RESP2 – 0 |
| RESP3 – 0 | RESP3 – 0 |
| FLAG – 11h | FLAG – 0 |

13 EXIT terminate program execution

| | |
|---|---|
| Description | Used to signal to the control software that the active transaction is finished. |
| Execution | TFLAG <– 0 |
| Encoding | [0A2h] (1 Byte) |
| Script Example | EXIT |

| Before Instruction | After Instruction |
|---|---|
| TFLAG – 1 | TFLAG – 0 |

14 GO TO unconditional relative branch

| | |
|---|---|
| Description | Used to update the transaction pointer and transfer program control to the new program location stored in the transaction pointer. If the value being stored in the transaction pointer is out of the current address range of the program, the program will be halted. The offset used for the relative branch is a 16 bit two's complement value. |
| Execution | TP = TP + Offset |
| Encoding | [0A7h][Offset] (3 Bytes) |
| Script Example | GO TO LOOP |

| Before Instruction | After Instruction |
|---|---|
| TP – 1000h | TP – 9F0h |
| LOOP – 9F0h | LOOP – 9F0h |
| OFFSET – 0FFF0h | OFFSET – 0FFF0h |

15 IF conditional branch

| | |
|---|---|
| Description | This instruction is used to form higher level constructs: IF, IF – THEN, IF – THEN – ELSE and WHILE. The two operands are logically or arithmetically compared. All comparisons are referenced to operand A. Operand B can be a register or an immediate value. If the logical or arithmetic comparison is true, the true offset will be added to the transaction pointer and program execution will be transfered to that new location. Otherwise, the false offset will be added to the transaction pointer. Below is a list of the available operators and their encoded values. |

| | |
|---|---|
| | 00h–">", Greater Than |
| | 01h–"<", Less Than |
| | 02h–">=", Greater Than or Equal to |
| | 03h–"<=", Less Than or Equal to |
| | 04h–"=", Equal to |
| | 05h–"!=", Not Equal to |
| | 06h–"AND", Logical AND |
| | 07h–"OR", Logical OR |
| Encoding | [A9h][Operator][Operand A][Operand B][True Offset][False Offset] (8/13 Bytes) |
| Script Example | IF (RESP1 == T0) THEN |

16 INPUT input response

| | |
|---|---|
| Description | Used to accept user input from the keyboard. The command can accept input from any location specified on the visible screen, specified by the X offset variable. The number of keys entered from the keyboard can be limited by the field width variable. If the field width variable is one, then an enter key is not needed to terminate an input response. If the timeout variable is non-zero, then the input response from the user will be timed and the remaining time will be displayed on the screen. If the timer expires, the input command will terminate automatically and the input buffer will contain a null string. There is one option available with the timed input response mode. The control program has the capability to display a decreasing score rather than time. This is achieved by specifying a register to decrement, a time to update the score and a value to decrement the register at every register update. The score will be displayed in the same location as the time. There is only a three character field to display the score within, so register values should not be greater the 999. If the initial register value to be displayed is grater than 999, then the input command will be terminated. The string that is specified with the input command has the exact same format as the string format for the display command. Refer to the display command for a definition of the string format. |
| Encoding | Timer Format [50h][Field Width][X offset][Timeout][String] Score Format [51h][Field Width][X offset][Timeout][Rs][Dec.][Time Inc.][String] |
| Script Example | INPUT "How much are you willing to bet?", 3, 33 INPUT "Enter your response\rnow?", 1, 30, 10, 0, 5, 2 |

17 KEY define new descryption key

| | |
|---|---|
| Description | When executed, the 16 bit value specified will replace decryption KEY #3. This will allow all subsequent transaction that were encrypted with KEY #3 to be decrypted by KEY #3. This command does not delete the other decryption keys, allowing other transactions to be decrypted by KEY #1 or KEY #2. |
| Execution | KEY3 <– Value |
| Encoding | [0A3h][Value] (# Bytes) |
| Script Example | KEY 1234 |

| Before Instruction | After Instruction |
|---|---|
| KEY3 – 55AA | KEY3 – 1234 |

18 LOCK lock out user input

| | |
|---|---|
| Description | Used during a live interactive broadcast to terminate an input command. This should be the only command in the transaction except for a display or |

|  | exit command. The lock command does not operate or exit command. The lock command does not operate on any register or memory location. It is basically a NOP command. The only function of this command is to terminate the currently executing program. |
|---|---|
| Execution | Told <-- Tnew |
| Encoding | [A8h] (1 Byte) |
| Script Example | DISPLAY "No more inputs at this\rtime"<br>LOCK<br>EXIT |

19 MOD calculate remainder

|  |  |
|---|---|
| Description | The contents of the destination register are divided by the contents of the source register and the remainder is stored in the destination register. |
| Execution | Rd <-- Rd % Rs |
| Encoding | [83h][Rd][Rs] (3 Bytes) |
| Script Example | T0 = T0 % T1 |
|  | Before Instruction    After Instruction<br>T0 – 113            T0 – 3<br>T1 – 10             T1 – 10 |

20 MODI calculate remainder by an immediate value

|  |  |
|---|---|
| Description | The contents of the destination register are divided by a 32 bit immediate value and the remainder is stored in the destination register. |
| Execution | Rd <-- Rd % Value |
| Encoding | [93h][Rd][Value] (6 Bytes) |
| Script Example | T0 = T0 % 20 |
|  | Before Instruction    After Instruction<br>T0 – 201           T0 – 1 |

21 MOV move register

|  |  |
|---|---|
| Description | The contents of the destination register are loaded with the contents of the source register. |
| Execution | Rd <-- Rs |
| Encoding | [84h][Rd][Rs] (3 Bytes) |
| Script Example | T0 = T1 |
|  | Before Instruction    After Instruction<br>T0 – 100          T0 – 200<br>T1 – 200          T1 – 200 |

22 MOVI load register with immediate value

|  |  |
|---|---|
| Description | The contents of the destination register are loaded with a 32 bit immediate value. |
| Execution | Rd <-- Value |
| Encoding | [94h][Rd][Value] (6 Bytes) |
| Script Example | T0 = 1000 |
|  | Before Instruction    After Instruction<br>T0 – 100          T0 – 100 |

23 MPY multiply registers

|  |  |
|---|---|
| Description | The contents of the destination register are multiplied with the contents of the source register and the result is stored in the destination register |
| Execution | Rd <-- Rd * Rs |
| Encoding | [85h][Rd][Rs] (3 Bytes) |
| Script Example | T0 = T0 * T1 |
|  | Before Instruction    After Instruction<br>T0 – 100          T0 – 2000<br>T1 – 20            T1 – 20 |

24 MPYI multiply register with an immediate value

|  |  |
|---|---|
| Description | The contents of the destination register are multiplied by a 32 bit immediate value and the result is stored in the destination register. |
| Execution | Rd <-- Rd * Value |
| Encoding | [95h][Rd][Value] (6 Bytes) |
| Script Example | T0 = T0 * 100 |
|  | Before Instruction    After Instruction<br>T0 – 100          T0 – 10000 |

25 OR or register

|  |  |
|---|---|
| Description | The contents of the destination register are ared with the contents of the source register and the result is stored in the destination register. |
| Execution | Rd <-- Rd OR Rs |
| Encoding | [86h][Rd][Rs] (3 Bytes) |
| Script Example | T0 = T0 OR T1 |
|  | Before Instruction    After Instruction<br>T0 – 8000h       T0 – 0F000h<br>T1 – 7000h       T1 – 7000h |

26 ORI or register with immediate value

|  |  |
|---|---|
| Description | The contents of the destination register are ored with a 32 bit immediate value and the result is stored in the destination register. |
| Execution | Rd <-- Rd OR Value |
| Encoding | [96h][Rd][Value] (6 Bytes) |
| Script Example | T0 = T0 OR 33h |
|  | Before Instruction    After Instruction<br>T0 – 8000h       T0 – 8033h |

27 PRESTORE store display string

|  |  |
|---|---|
| Description | Used to store a display string to one of the six prestored mesage buffers in non-volatile memory. The display string can have a maximum length of eight display lines and can have any of the string delimiters embedded in the string except for the variable delimiter. Of the string length is longer than eighty display lines and the message number specified is not within the range of 6 – 10, then the command will be ignored. |
| Execution | MSG[#] <-- String |
| Encoding | [0A6h][Message #][String] |
| Script Example | PRESTORE "Please try again", 6<br>MSG[6] <-- "Please try again" |

28 RNG specify input range

|  |  |
|---|---|
| Description | The contents of the low & high registers are saved and used to execute input value range checking anytime an input command is executed. If the range command was not specified, then all input commands in the current transaction will not be range checked. If the input response is within the range, the processing of opcodes will continue. If the input response was entered for the first time the prestored message #2 will be displayed for two seconds and the user will be allowed to respond one more time after the display is restored. If the response was the second attempt the prestored message #3 will be displayed for two seconds and the input command terminated with a zero placed in the input buffer. The controller will begin executing opcodes after the input opcode. |
| Execution | Low Range <-- Rl<br>High Range <-- Rh |
| Encoding | [8Bh][Rl][Rh] (3 Bytes) |
| Script Example | RANGE T0, T1 |
|  | Before Instruction    After Instruction<br>T0 – 1             T0 – 1<br>T1 – 2             T1 – 2<br>RL – 10           RL – 1<br>RH – 20           RH – 2<br>RFLAG – 0      RFLAG – 1 |

29 RNGI specify input range with immediate values

|  |  |
|---|---|
| Description | The low & high 32 bit immediate values are saved and used to execute input value range checking anytime an input command is executed. If the range command was not specified, then all input commands in the current transaction will not be range checked. If the input response is within the |

| | | |
|---|---|---|
| | range, the processing of opcodes will continue. If the input response was entered for the first time the prestored message #2 will be displayed for two seconds and the user will be allowed to respond one more time after the display is restored. If the response was the second attempt the prestored message #3 will be displayed for two seconds and the input command terminated with a zero placed in the input buffer. The controller will begin executing opcodes after the input opcode. | |
| Execution | Low Range <-- Low Value High Range <-- High Value | |
| Encoding | [0A1h][Low Value][High Value] (9 Bytes) | |
| Script Example | RANGE 1, 2 | |
| | Before Instruction | After Instruction |
| | RL – 10 | RL – 1 |
| | RH – 20 | RH – 2 |
| | RFLAG – 0 | RFLAG – 1 |
| | 30 RSTF reset PIU flag bit | |
| Description | This instruction resets a bit of the PIU flag register. The bit that is reset is specified in the instruction. | |
| Execution | PIU[PID].FLAG[BIT] <-- 0 | |
| Encoding | [00010b][xxx] (1 Byte) | |
| Script Example | RSTF 3 | |
| | Before Instruction | After Instruction |
| | FLAG – FFh | FLAG – F7 |
| | 31 SETF sets PIU flag bit | |
| Description | This instruction sets a bit of the PIU flag register. The bit that is set is specified in the instruction. | |
| Execution | PIU[PID].FLAG[BIT] <-- 1 | |
| Encoding | [00011b][xxx] (1 Byte) | |
| Script Example | SETF 3 | |
| | Before Instruction | After Instruction |
| | FLAG – 10h | FLAG – 18h |
| | 32 SHL shift register left | |
| Description | The contents of the destination register are shifted left by the number of bits specified by the value in the source register. | |
| Execution | Rd <-- Rd SHL Rs | |
| Encoding | [87h][Rd][Rs] (3 Bytes) | |
| Script Example | T0 = T0 SHL T1 | |
| | Before Instruction | After Instruction |
| | T0 – 1000h | T0 – 8000h |
| | T1 – 3 | T1 – 3 |
| | 33 SHLI shift register left by an immediate value | |
| Description | The contents of the destination register are shifted left by the number of bits specified by the 32 bit immediate value. | |
| Execution | Rd <-- Rd SHL Value | |
| Encoding | [97h][Rd][Value] (6 Bytes) | |
| Script Example | T0 = T0 SHL 8 | |
| | Before Instruction | After Instruction |
| | T0 – 100h | T0 – 10000h |
| | 34 SHR shift register right | |
| Description | The contents of the destination register are shifted right by the number of bits specified by the value in the source register. | |
| Execution | Rd <-- Rd SHR Rs | |
| Encoding | [88h][Rd][Rs] (3 Bytes) | |
| Script Example | T0 = T0 SHR T1 | |
| | Before Instruction | After Instruction |
| | T0 – 1000h | T0 – 200h |
| | T1 – 3 | T1 – 3 |
| | 35 SHRI shift register right by an immediate value | |
| Description | The contents of the destination register are shift right by the number of bits specified by the 32 bit immediate value. | |
| Execution | Rd <-- Rd SHR Value | |
| Encoding | [98h][Rd][Value] (6 Bytes) | |
| Script Example | T0 = T0 SHR 8 | |
| | Before Instruction | After Instruction |
| | T0 – 1000h | T0 – 10h |
| | 36 SUB subtract registers | |
| Description | The contents of the destination register are subtracted from the contents of the source register and the result is stored in the destination register. | |
| Execution | Rd <-- Rd – Rs | |
| Encoding | [89h][Rd][Rs] (3 Bytes) | |
| Script Example | T0 = T0 – T1 | |
| | Before Instruction | After Instruction |
| | T0 – 100 | T0 – 80 |
| | T1 – 20 | T1 – 20 |
| | 37 SUBI subtract immediate value from register | |
| Description | The contents of the destination register are subtracted by a 32 bit immediate value and the result is stored in the destination register. | |
| Execution | Rd <-- Rd – Value | |
| Encoding | [99h][[Rd][Value] (6 Bytes) | |
| Script Example | T0 '2 T0 – 50 | |
| | Before Instruction | After Instruction |
| | T0 – 100 | T0 – 50 |
| | 38 TIME verify real time | |
| Description | When this instruction is executed, the date and time of the real time clock is comapred to the date and time specified with this instruction. Due to the potential for the real time clock to drift over time, the comparison will be made over a range of +— one minute. If the time of the handheld is out of this range, the unit will be set to it's uninitialized state and will no longer have the ability to process new transactions until it is reinitialized. If this instruction is used, it shloud be the first executable instruction in a transaction. | |
| Execution | If (Real Time == Time Stamp) Then Process Transaction Else Disable Handheld | |
| Encoding | [60h][TIME/DATE] (5 Bytes) The encoded value of the year is the difference between the present year and the year 1990. Below is a table of the encoded date and time: Byte #1 - M1 M0 S5 S4 S3 S2 S1 S0 Byte #2 - H3 H2 H1 H0 M5 M4 M3 M3 Byte #3 - M1 M0 D4 D3 D2 D1 D0 H4 Byte #4 - Y5 Y4 Y3 Y2 Y1 Y0 M3 M2 | |
| Script Example | TIME @TIME, @DATE The current date and time variables are inserted by the RDI when it detects the time opcode. This is to insure that the real time of the handheld should match the real time of the program being aired. | |
| | 39 XOR exclusive or registers | |
| Descriptions | The contents of the destination register are exclusive ored with the contents of the source register and the result is stored in the destination register. | |
| Execution | Rd <-- Rd XOR Rs | |
| Encoding | [8Ah][Rd][Rs] (3 Bytes) | |
| Script Example | T0 = T0 XOR T1 | |
| | Before Instruction | After Instruction |
| | T0 – 8000h | T0 – 4000h |
| | T1 – 0C000h | T1 – 0C000h |
| | 40 XORI exclusive or register with immediate value | |
| Description | The contents of the destination register are exclusive ored with a 32 bit immediate value and the result is stored in the destination register. | |
| Execution | Rd <-- Rd XOR Value | |

| | |
|---|---|
| Encoding | [9Ah][Rd][Value] (6 Bytes) |
| Script Example | T0 '2 T0 XOR 8033h |
| | Before Instruction     After Instruction |
| | T0 – 8000h           T0 – 33h |

Copyright 1991 Watch & Win

TABLE 3

Prestored Messages

| | |
|---|---|
| Message #1 | Line 1 - Too Late! Try next time! |
| Message #2 | Mine 1 - Not a valid choice.\r<br>Line 2 - Try again now! |
| Message #3 | Line 1 - Still not valid.\r<br>Line 2 - Better luck next time! |
| Message #4 | Line 1 - Press enter after your\r<br>Line 2 - answer. |
| Message #11 | Line 1 - Enter your choice now. |
| Message #12 | Line 1 - Enter your answer now. |
| Message #13 | Line 1 - Select your answer &\r<br>Line 2 - then press "Enter" |
| Message #14 | Line 1 - Sorry invalid answer. You.<br>Line 2 - have one more chance now |
| Message #15 | Line 1 - Invalid answer. No answer<br>Line 2 - will be accepted now. |
| Message #16 | Line 1 - Good answer! You are\r<br>Line 2 - right! |
| Message #17 | Line 1 - Wrong answer. Too Bad! |
| Message #18 | Line 1 - Good try! You can do\r<br>Line 2 - next time! |
| Message #19 | Line 1 - Nice try! Better luck\r<br>Line 2 - a winner! |
| Message #20 | Line 1 - Good score! You may be\r<br>Line 2 - a winner! |
| Message #21 | Line 1 - Enter answer before the\r<br>Line 2 - time displayed runs out! |
| Message #22 | Line 1 - The faster you answer,\r<br>Line 2 - the higher you score!. |
| Message #23 | Line 1 - Not fast enough. Sorry. |
| Message #24 | Line 1 - Sorry, too late. |
| Message #25 | Line 1 - Thank you. |
| Message #26 | Line 1 - Thanks for playing! Tune<br>Line 2 - in & play again soon! |
| Message #27 | Line 1 - Thanks for tuning in!\r<br>Line 2 - Please join us again! |
| Message #28 | Line 1 - Tunbe in and try again\r<br>Line 2 - next time! |
| Message #29 | Line 1 - To qualify to win, you\r<br>Line 2 - must register your score |
| Message #30 | Line 1 - To enter by mail, press\r<br>Line 2 - "yes" now. |
| Message #31 | Line 1 - To register your score\r<br>Line 2 - by mail press, "yes" now. |
| Message #32 | Line 1 - To save your score press<br>Line 2 - "save" then 1, 2 or 3;or\r<br>Line 3 - write your score down\r<br>Line 4 - now! |
| Message #33 | Line 1 - To save this info, press\r<br>Line 2 - "save" then 1, 2 or 3; or\r<br>Line 3 - write it down now. |
| Message #34 | Line 1 - To save phone# press\r<br>Line 2 - "save" then 1, 2 or 3; or\r<br>Line 3 - write it down now. |
| Message #35 | Line 1 - To get survey results,\r<br>Line 2 - press "yes" now. |
| Message #36 | Line 1 - To get poll results,\r<br>Line 2 - press "yes" now. |
| Message #37 | Line 1 - To get a copy of the\r<br>Line 2 - rules, press "yes" now. |
| Message #38 | Line 1 - Winners will be notified<br>Line 2 - by certified mail. |
| Message #39 | Line 1 - To get the list of\r<br>Line 2 - by certified mail. |
| Message #40 | Line 1 - To get your test results<br>Line 2 - press "yes" now. |
| Message #41 | Line 1 - To get your game score,\r<br>Line 2 - press "yes" now. |

TABLE 3-continued

Prestored Messages

| | |
|---|---|
| Message #42 | Line 1 - To get your score result<br>Line 2 - press "yes" now. |
| Message #43 | Line 1 - You must be 12 or older\r<br>Line 2 - to use 900#'s. |
| Message #44 | Line 1 - Parental consent needed\r<br>Line 2 - if under 18 years old. |
| Message #45 | Line 1 - Must be 18 years or\r<br>Line 2 - older to win. |
| Message #46 | Line 1 - Void where prohibitied by<br>Line 2 - law |
| Message #47 | Line 1 - For more information,\r<br>Line 2 - press "yes" now. |
| Message #48 | Line 1 - For a summary of rules\r<br>Line 2 - press "yes" now. |
| Message #49 | Line 1 - Welcome to a new TV\r<br>Line 2 - experience! |
| Message #50 | Line 1 - Hello! We hope you are\r<br>Line 2 - enjoying our program! |
| Message #51 | Line 1 - We're glad you're back! |

TABLE 4

GAME EXAMPLE

Introduction of the NBL $ Million BB Challenge
(Insert during pre-game show broadcast)
Copyright 1991 Watch & Win

Display - Msg 1

```
It's The NBL Play-Off
$ Million BB Challenge!
```

```
You can play along & win
$100,000+ as a SuperFan ↓
```

```
or a $25,000 US Savings
Bond as a Jr. SuperFan! ↓
```

```
Enter your game level
now: ↓
```

Display - Msg 2
Note: Once game level is selected, Display only messages related to that game level
If no selection is made show Superfan version?

```
1 = SuperFan: must be 18 or
older to win! or enter ↓
```

```
2 = Jr. SuperFan: Parental
consent needed, must be ↓
```

```
12 thru 17 years of age
to win! ↓
```

```
(blank)
```

If 1, Display Msg - S1

```
Welcome SuperFan! By
correctly answering the ↓
```

```
questions we ask, you can
score points & win the ↓
```

```
following prizes: Highest
registered total series ↓
```

```
score: Series Grand Prize
$100,000 & trip for 2 ↓
```

Display Msg - S2

```
to World Series Game 1;
Series 1st Prize $25,000 ↓
```

```
& autographed ball from
winning playoff team; ↓
```

```
Series 2nd Prize $10,000
Series 3rd Prize $5,000 ↓
```

```
You can also win for the
highest registered ↓
```

TABLE 4-continued

GAME EXAMPLE

Display Msg S3 score of a single game!
Game 1st Prize $10,000; ↓

Game 2nd Prize $5,000;
Game 3rd Prize $2,500;

Only 1 game prize per
registered handheld; In ↓ case of tie, winner will
be decided by random ↓

Display Msg S4 drawing. Consolation
Prize of an official NBL ↓ team jacket of choice
will be awarded.

Display Prestored Msg 36

Void where prohibited by
law.

Display Prestored Msg 35

Must be 18 years or
older to win.

If 2, Display Msg Jr 1

Welcome Jr SuperFan! By
correctly answering the ↓ questions we ask, you can
score points & win the ↓ following prizes: Highest
registered total series ↓ score: Series Grand Prize
$25,000 US Savings Bond ↓

Display Msg Jr 2

& trip for 2 to World
Series Game 1;

Series 1st Prize $10,000
US Savings Bond & ↓ autographed ball from
winning playoff team; ↓

Series 2nd Prize $5,000
US Savings Bond; ↓

TABLE 4-continued

GAME EXAMPLE

Display Msg Jr 3

| S | e | r | i | e | s |   | 3 | r | d |   | P | r | i | z | e |   | $ | 2 | , | 5 | 0 | 0 |   |
| U | S |   | S | a | v | i | n | g | s |   | B | o | n | d | ; |   | y | o | u |   |   |   | ↓ |

| c | a | n |   | a | l | s | o |   | w | i | n |   | f | o | r |   | t | h | e |   |   |   |   |
| h | i | g | h | e | s | t |   | r | e | g | i | s | t | e | r | e | d |   |   |   |   |   | ↓ |

| s | c | o | r | e |   | o | f |   | a |   | s | i | n | g | l | e |   | g | a | m | e | : |   |
| G | a | m | e |   | 1 | s | t |   | P | r | i | z | e |   | $ | 1 | , | 0 | 0 | 0 |   |   | ↓ |

| U | S |   | S | a | v | i | n | g | s |   | B | o | n | d |   | & |   | a | u | t | o | - |   |
| g | r | a | p | h | e | d |   | b | a | l | l |   | f | r | o | m |   | a |   |   |   |   | ↓ |

Display Msg Jr 4

| f | a | v | o | r | i | t | e |   | N | B | L |   | p | l | a | y | e | r | ; |   |   |   |   |
| G | a | m | e |   | 2 | n | d |   | P | r | i | z | e |   | S | 5 | 0 | 0 |   | U | S |   | ↓ |

| S | a | v | i | n | g | s |   | B | o | n | d | ; |   | G | a | m | e |   | 3 | r | d |   |   |
| P | r | i | z | e |   | $ | 1 | 0 | 0 |   | U | S |   | S | a | v | i | n | g | s |   |   | ↓ |

| B | o | n | d | ; |   | O | n | l | y |   | 1 |   | g | a | m | e |   | p | r | i | z | e |   |
| p | e | r |   | r | e | g | i | s | t | e | r | e | d |   | h | a | n | d | h | e | l | d | ↓ |

| I | n |   | a |   | t | i | e | , |   | a |   | w | i | n | n | e | r |   | w | i | l | l |   |
| b | e |   | d | e | c | i | d | e | d |   | b | y |   | r | a | n | d | o | m |   |   |   | ↓ |

Display Msg Jr 5

| d | r | a | w | i | n | g | . |   | C | o | n | s | o | l | a | t | i | o | n |   |   |   |   |
| p | r | i | z | e |   | o | f |   | a | n |   | o | f | f | i | c | i | a | l |   |   |   | ↓ |

| N | B | L |   | b | a | t |   | & |   | g | l | o | v | e |   | w | i | l | l |   | b | e |   |
| a | w | a | r | d | e | d | . |   |   |   |   |   |   |   |   |   |   |   |   |   |   |   |   |

Display Prestored Msg 36

|   |   |   |   |   |   |   |   |   |   |   |   |   |   |   |   |   |   |   |   |   |   |   |   |
|   |   |   |   |   |   |   |   |   |   |   |   |   |   |   |   |   |   |   |   |   |   |   |   |

Display Prestored Msg 34

|   |   |   |   |   |   |   |   |   |   |   |   |   |   |   |   |   |   |   |   |   |   |   |   |
|   |   |   |   |   |   |   |   |   |   |   |   |   |   |   |   |   |   |   |   |   |   |   |   |

Display as Msg S5 & Jr 6

| E | n | j | o | y |   | t | h | e |   | g | a | m | e | , |   | t | h | e | r | e |   |   |   |
| w | i | l | l |   | b | e |   | a |   | s | i | n | g | l | e |   | b | e | e | p |   |   | ↓ |

| b | e | f | o | r | e |   | e | v | e | r | y |   | q | u | e | s | t | i | o | n | . |   |   |
| P | l | a | y | b | a | l | l | ! |   | G | o | o | d |   | l | u | c | k | ! |   |   |   |   |

|   |   |   |   |   |   |   |   |   |   |   |   |   |   |   |   |   |   |   |   |   |   |   |   |
|   |   |   |   |   |   |   |   |   |   |   |   |   |   |   |   |   |   |   |   |   |   |   |   |

|   |   |   |   |   |   |   |   |   |   |   |   |   |   |   |   |   |   |   |   |   |   |   |   |
|   |   |   |   |   |   |   |   |   |   |   |   |   |   |   |   |   |   |   |   |   |   |   |   |

Start of every game at top of 1st inning.

TABLE 4-continued

GAME EXAMPLE

Display Msg S6 & Jr 7 for 15 seconds (store response for later use)

```
For  10  pts, who   will   win
this   game?  Enter   now        ↓
```

```
1  for  Atlanta   Braves   or
2  for  Pitts   Pirates
```

```
For  5  pts, what  will  be
Atlanta's   team   batting      ↓
```

Display Msg S7 for 15 seconds & store response fo later use

```
ave.  for  this   game?
Answers  w/in  5%  over  or   ↓
```

```
under   actual   ave  will   be
accepted   as   right. Enter   ↓
```

```
your   answer   now.
```

Display Msg Jr 8 for 15 seconds

```
For  5  pts,  will   Atlanta's
team  batting   average         ↓
```

```
for   this   game  be:
1:  Within   .228  -  .252    ↓
```

Display Prestored Msg 3 & store response for later use.

```
2 =  over   .252
3 =  under   .228
```

```
```

Display Msg S8 for 15 seconds & store response for later use

```
For  5pts, what  will  be
Pitts   team  batting   ave.   ↓
```

```
for  this   game?  Answers
w/in  5%  over  or  under     ↓
```

```
actual   ave  will   be
accepted   as   right. Enter   ↓
```

```
your   answer   now.
```

Display Msg Jr 9 for 15 seconds

```
For  5  pts, will   Pitts's
team  batting   average         ↓
```

```
for  this   game  be:
1 =  within   .234  -  .258   ↓
```

TABLE 4-continued

GAME EXAMPLE

Display Prestored Msg 3 for J & include as part of Msg J9 & store response for later use

| 2 | = |   | o | v | e | r |   | . | 2 | 5 | 8 |
| 3 | = |   | u | n | d | e | r |   | . | 2 | 3 | 4 |

Superfan questions for the start of the Top and Bottom
of every Inning starting w/2nd Inning.

Ques. Top of 2
Display for 15 secs.

| F | o | r |   | 5 |   | p | t | s | , |   | h | o | w |   | m | a | n | y |   | g | a | m | e | s |
| d | i | d |   | P | i | r | a | t | e | s |   | w | i | n |   | i | n |   |   |   |   |   |   | ↓ |

| A | t | l | a | n | t | a |   | d | u | r | i | n | g |   | t | h | e |   | 1 | 9 | 9 | 1 |
| s | e | a | s | o | n | ? |

Insert Prestored
Msg 2

If answer = 0
then score 5 pts and display:

| Y | o | u | ' | r | e |   | u | p |   | o | n |   | y | o | u | r |   | s | t | a | t | s | - |
| y | o | u |   | s | c | o | r | e |   | 5 |   | p | t | s | ! |

If answer ≠ 0
then score 0 pts and display:

| S | o | r | r | y | , |   | p | i | r | a | t | e |   | s | e | a | s | o | n |
| r | e | c | o | r | d |   | i | n |   | A | t | l | a | n | t | a |   | 0 | - | 6 |

Jr. Superfan Questions For the Start of the Top & Bottom
of Every Inning Starting w/2nd Inning

TABLE 4-continued
GAME EXAMPLE

Jr. Ques. Top of 2
Display for 20 secs.

> `For 5 pts, how many shut-`
> `outs did the Pirates        ↓`
>
> `have during their 1991`
> `season?`

Insert Prestored
Msg 2

If answer = 16
(was 1990 record)
then score 5 pts
& display:

> `Right for 5 pts - you`
> `know the Pirates`

If answer ≠ 16
then score 0 pts
and display:

> `Wrong. Sorry, Pirates had`
> `16 shutouts this season.`

Preproduced for
live, on-line insertion
producer decides on
question:

Questions to be asked with every new batter
except the lead off batter at the top & bottom
of each inning-producer decides which question
is asked.

Each question:
score 1 pt for
right answer;
0 pt for wrong
answer

Ques 100

> `Will this team score a`
> `run this inning?           ↓`
>
> `Enter yes or no.`

Ques 101

> `Will the pitch be called`
> `1 = strike or 2 = ball?`

Ques 102

> `Will the batter: 1 = hit`
> `2 = walk or 3 = strike out?`

Ques 103

> `Enter your choice.`
> `Will the pitch be:         ↓`
>
> `1 = fastball 2 = curve ball`
> `3 = slider 4 = breaking ball`

Ques 104

> `Will the play be called`
> `an error? Yes or No.`

Ques 105

> `Will the batter try to`
> `bunt? Yes or No`

TABLE 4-continued

GAME EXAMPLE

Ques 107: `Will the runner try to Steal? Yes or No.`

Ques 108: `Will they try a squeeze play now? Yes or No`

Ques 109: `Will they intentionally walk this batter? Yes/No`

Ques 110: `Is the runner 1 = safe or 2 = out?`

Ques 111: `Will the pitcher be called for a balk? Yes/No`

Standard Feedback Display to responses for:

right ans.: `Great call! You score 1 point!` wrong answer: `Bad call! Sorry!`

After Last Out of Each Game:
(Standard process)

For responses to Ques/Msg S6:

If answer = 1 then add 10 pts to score & display for 15 secs: `Atlanta wins! Good call! you score 10 pts.`

If answer = 4 then add 10 pts to score & display for 15 secs.: `Atlanta wins! Glad you changed your mind - ↓` `You score 4 pts.`

If answer = 2 or 5 then score 0 pts & display for 15 secs.: `Pirates lose - too bad! You score no points.`

(Note software must calculate 5% over & under range when actual team ave. entered (.231)

For responses to Ques/Msg S7:

Display for 10 secs.: `Atlanta Braves team game batting average was .231`

If answer is in 5% over or under range of .231 then add 5 pts to score & display for 10 secs.: `Good call. You score 5 pts`

If answer is not in 5% over or under range of .231 then score 0 pts & display for 10 secs.: `Sorry. Better luck next time. No points scored!`

TABLE 4-continued

GAME EXAMPLE

For responses to Ques/Msg S8: (again software to calculate 5% over & under range when actual team ave. entered (.224)

Display for 10 secs. then:

| P | i | t | t | s | | P | i | r | a | t | e | s | | t | e | a | m | | g | a | m | e |
|---|---|---|---|---|---|---|---|---|---|---|---|---|---|---|---|---|---|---|---|---|---|---|
| b | a | t | t | i | n | g | | a | v | e | r | a | g | e | | w | a | s | | . | 2 | 2 | 4 |

If answer is in 5% over or under range of .224 then add 5 pts to score & display for 10 secs

| G | o | o | d | | c | a | l | l | ! | Y | o | u | | s | c | o | r | e | | 5 | p | t | s |
|---|---|---|---|---|---|---|---|---|---|---|---|---|---|---|---|---|---|---|---|---|---|---|---|

If answer is not in 5% over or under range of .224 then score 0 pts & display for 10 secs.

| T | o | o | | b | a | d | ! | Y | o | u | | g | e | t | | 0 | p | t | s | | | | |
|---|---|---|---|---|---|---|---|---|---|---|---|---|---|---|---|---|---|---|---|---|---|---|---|
| t | h | i | s | | t | i | m | e | . | | | | | | | | | | | | | | |

Display for 1 minute

| T | h | a | n | k | s | | f | o | r | | p | l | a | y | i | n | g | , | y | o | u | | |
| c | o | u | l | d | | b | e | | a | | w | i | n | n | e | r | | o | f | | | | ↓ |

| t | h | i | s | | g | a | m | e | | - | r | e | m | e | m | b | e | r | : | | | | |
| G | a | m | e | 6 | | 1 | s | t | | P | r | i | z | e | | $ | 1 | 0 | , | 0 | 0 | 0 | ↓ |

| G | a | m | e | 6 | | 2 | n | d | | P | r | i | z | e | | $ | 5 | , | 0 | 0 | 0 | ; | |
| G | a | m | e | 6 | | 3 | r | d | | P | r | i | z | e | | $ | 2 | , | 5 | 0 | 0 | ; | ↓ |

| F | o | r | | a | | c | o | m | p | l | e | t | e | | l | i | s | t | | o | f | | |
| p | r | i | z | e | s | : | 1 | - | 9 | 0 | 0 | - | N | B | L | - | P | R | I | Z | | | ↓ |

For 1 minute Display: after
1) Calculating total Game 6 score
2) encoding for score registration;
3) adding Game 6 score to series cumulative score
4) save Game 6 score to be displayed before beginning of Game 7

| T | o | | q | u | a | l | i | f | y | | a | s | | a | | p | o | s | s | i | b | l | e |
| w | i | n | n | e | r | | o | f | | g | a | m | e | | 6 | , | | y | o | u | | | ↓ |

| m | u | s | t | | r | e | g | i | s | t | e | r | | y | o | u | r | | s | c | o | r | e |
| b | y | | 6 | A | M | , | O | c | t | . | 1 | 7 | , | T | h | u | r | s | d | a | y | . | ↓ |

| T | o | | r | e | g | i | s | t | e | r | | y | o | u | r | | P | l | a | y | o | f | f |
| G | a | m | e | | 6 | | s | c | o | r | e | | c | a | l | l | : | | | | | | ↓ |

| 1 | - | 9 | 0 | 0 | - | 9 | 9 | 9 | - | B | A | S | E | | & | | E | n | t | e | r | | |
| 4 | 4 | 2 | 9 | - | 6 | 6 | 1 | 1 | - | 8 | 7 | 9 | 9 | - | 0 | 0 | 2 | 2 | | | | | ↓ |

Display Prestored Msg. 22

| | | | | | | | | | | | | | | | | | | | | | | | ↓ |
| | | | | | | | | | | | | | | | | | | | | | | | ↓ |

Display

| C | o | s | t | | o | f | | 9 | 0 | 0 | | c | a | l | l | | f | o | r | | | | |
| s | c | o | r | e | | r | e | g | i | s | t | r | a | t | i | o | n | | i | s | | $ | 2 |

We claim:

1. An interactive presentation system comprising:

a receiver adapted to receive a plurality of units of interactive event specific data throughout a presentation of a first event, said first event having a plurality of aspects which make up said first event, each of said units of interactive event specific data being associated with one of said aspects, said units of said interactive data being received immediately before or during said associated aspect of said first event such that said interactive system need only receive said interactive event specific data associated with said associated aspect in order to allow a participant to interact with said associated aspect;

a processor, in communication with said receiver, said processor adapted to present a transaction, said transaction based on said interactive event specific data and capable of having a result;

a memory adapted to store at least a subset of said event specific data and said result of said transaction, said memory including a plurality of transaction structures, each transaction structure including an identification number, a particular one of said transaction structures is updated because of said transaction if said interactive event specific data includes a reference to said identification number of said particular transaction structure; and a participant input device, in communication with said processor.

2. The system of claim 1, wherein:

said memory is adapted to store a cumulative score generated by said processor, said cumulative score representing an accumulation of results of a plurality of transactions during said first event.

3. The system of claim 1, wherein said participant input device includes a display and a keyboard adapted to allow said participant to input a response.

4. The system of claim 1, wherein:

said memory includes means for allowing said first event and said one or more aspects within said first event to be interleaved with at least a second event and any aspects within said second event while allowing said participant to interact with any of said aspects of said first and second events.

5. The system of claim 1, wherein:

said interactive event specific data is encoded in a television signal; and said receiver includes means for reading said interactive event specific data from said television signal.

6. The system of claim 1, wherein:

said receiver receives said interactive event specific data transparently to said participant.

7. An interactive presentation system comprising:

a receiver adapted to receive interactive data, said interactive data includes a first set of commands and first event specific data associated with a first television program broadcast on a first television channel and a second set of commands and second event specific data associated with a second television program broadcast on a second television channel;

a memory including a plurality of transaction structures, said memory being adapted to store data in said transaction structures in response to said interactive data, said plurality of transaction structures including a first transaction structure and a second transaction structure; and a processor, in response to said interactive data, adapted to present transactions having results such that when said receiver receives said first event specific data said transactions presented are in association with said first event specific data and results of said transactions are used to update a first transaction structure and said second transaction structure is not updated, and when said receiver receives said second event specific data said transactions presented are in association with said second event specific data and results of said transaction are used to update a second transaction structure and said first transaction structure is not updated.

8. The system of claim 7, wherein:

said interactive data is transmitted within a television signal, and said receiver reads said interactive data from said television signal.

9. The system of claim 7, wherein:

said processor generates a first cumulative score based on said transactions presented in association with said first event and a second cumulative score based on said transactions presented in association with said second event;

said first transaction structure stores said first cumulative score; and said second transaction structure stores said second cumulative score.

10. A system according to claim 7, wherein:

said first event and said second event are broadcast at overlapping times.

11. A method for receiving and presenting interactive programs on an interactive system, said interactive system including a memory unit, said memory unit including a first transaction structure having a first identification code and a second transaction structure having a second identification code different from said first identification code, said method comprising the steps of:

(a) receiving first interactive data associated with a first event, said first interactive data including commands and event specific data, said first interactive data including a reference to said first identification code, said first interactive data including a plurality of aspects, each aspect being self contained so that a transaction may be presented based on one aspect of said first interactive data without relying on a previous-in-time aspect of said first interactive data;

(b) presenting a participant with a transaction based on one aspect of said first interactive data without updating said second transaction structure;

(c) updating said first transaction structure based on step (b) without updating said second transaction structure;

(d) receiving second interactive data associated with a second event, said second interactive data including commands and event specific data, said second interactive data including a reference to said second identification code, said second interactive data including a plurality of aspects, each aspect being self contained so that a transaction may be presented based on one aspect of said second interactive data without relying on a previous-in-time aspect of said second interactive data;

(e) presenting said participant with a transaction based on one aspect of said second interactive data without updating said first transaction structure; and (f) updating said second transaction structure based on step (e) without updating said first transaction structure.

12. A method according to claim 11, further including the steps of:

presenting said participant with a plurality of transactions based on said second interactive data without updating said first transaction structure;

presenting said participant with a plurality of transactions based on said first interactive data without updating said second transaction structure;

interleaving said transactions based on said first interactive data with transactions based on said second interactive data.

13. A method according to claim 11, wherein said first interactive data is received on a first channel and said second interactive data is received on a second channel.

14. A method according to claim 11, wherein said first interactive data is received on a first channel and said second interactive data is received on said first channel.

15. A method according to claim 11, wherein said first interactive data is received at a first time and said second interactive data is received at a second time.

16. A method according to claim 11, wherein said first interactive data and said second interactive data are received at least in part concurrently.

17. A method according to claim 11, wherein said first interactive data and said second interactive data are received during overlapping time periods.

18. A method according to claim 11, wherein said first event and said second event occur during overlapping time periods.

19. A method for making an interactive program to be presented on a selectively tuneable television monitor, comprising the steps of:

constructing interactive data which is relevant to a plurality of aspects which when taken together comprise a first event of an interactive video presentation such that said interactive data is self-contained and does not rely on interactive data for previous-in-time aspects of said first event; and sending said interactive data synchronized with said plurality of aspects such that said interactive data for any one of said plurality of aspects is received immediately before or during a presentation of said any one aspect so that a participant need not be tuned to said first event from said beginning of said first event in order to interact with said any one aspect, said interactive data being transparent to said participant;

constructing interactive data which is relevant to each of a plurality of aspects which when taken together comprise a second event such that said interactive data relevant to said each aspect of said second event is self-contained and does not rely on said interactive data for a previous-in-time aspect of said second event; and interleaving at least one of said aspects of said second event with said any one aspects of said first event in order to make said presentation to said participant, such that said participant need not be tuned to either said first or said second events from said beginning of either said first or said second events in order to interact with said any one aspect of said first event or said one aspect of said second event.

20. A method of broadcasting an interactive program to be presented on a selectively tuneable television monitor, comprising the steps of:

broadcasting a first event, said first event having a first plurality of aspects including a first aspect and a second aspect;

broadcasting a second event, said second event including a second plurality of aspects;

transmitting first interactive data which is relevant to said first aspect of said first event, said first interactive data is self-contained and does not rely on interactive data for previous-in-time aspects of said first event, said transmission of first interactive data synchronized with said broadcast of said first aspect of said first event such that said first interactive data is received immediately before or during said presentation of said first aspect so that said participant need not be tuned to said previous-in-time aspects of said first event in order to interact with said first aspect;

transmitting second interactive data which is relevant to said second aspect of said first event, said second interactive data is self-contained and does not rely on interactive data for previous-in-time aspects of said first event, said transmission of second interactive data synchronized with said broadcast of said second aspect of said first event such that said second interactive data is received immediately before or during said presentation of said second aspect so that said participant need not be tuned to said previous-in-time aspects of said first event in order to interact with said first aspect;

transmitting third interactive data which is relevant to one aspect of said second plurality of aspects, said third interactive data is self-contained and does not rely on interactive data for previous-in-time aspects of said second event, said transmission of said third interactive data synchronized with said broadcast of said one aspect of said second event such that said third interactive data is received immediately before or during said presentation of said one aspect of said second event so that said participant need not be tuned to said previous-in-time aspects of said second event in order to interact with said one aspect;

wherein said one aspect of said second event occurs after said first aspect of said first event and before said second aspect of said first event, said participant being able to interact with said first aspect of said first event, said second aspect of said first event and said one aspect of said second event.

21. A method of broadcasting an interactive presentation according to claim 20, wherein:

said first event and said second event are on different channels.

22. A method of broadcasting an interactive presentation according to claim 20, wherein:

said first event and said second event are on a same channel.

23. A method of broadcasting an interactive presentation according to claim 20, wherein:

said first event and said second event occur during overlapping time intervals.

24. An interactive television system, comprising:

a receiver adapted to receive interactive data, said interactive data including first data and second data;

a processor adapted to present transactions based on said interactive data;

a memory, in communication with said processor, said memory including a plurality of programmer tables, said programmer tables include a location to store an identification number and a score, said plurality of programmer tables including a first programmer table having a first identification number and a second programmer table having a second identification number, said first data including said first identification number, said second data including said second identification number, said first programmer table being updated when said processor processes said first data, said second programmer table not being updated when said processor processes said first programmer table, said second programmer table being updated when said processor processes said second data, said first programmer table not being updated when said processor processes said second data.

25. An interactive television system to be used while viewing a television, said television capable of presenting at least one of a plurality of programs, said plurality of programs being broadcasted concurrently or disposed in time, each of said plurality of programs including interactive data having a programmer table ID, said system comprising:

a receiver adapted to receive said interactive data of said presented program;

a processor adapted to present transactions based on said received interactive data;

a memory, in communication with said processor, said memory including a plurality of programmer tables, said programmer tables include an identification number and a location for storing a score, a particular programmer table being updated when said processor is presenting transactions based on interactive data which includes a programmer ID that matches said identification number of said particular programmer table.

26. An interactive television system according to claim 25, further including a participant input device in communication with said processor.

27. An interactive television system according to claim 25, wherein said receiver receives said interactive data transparently to a participant.

28. The system according to claim 7 wherein:

said first event and said second are broadcast at different times.

29. The method of claim 19 further including the steps of:

sending said interactive data for said first event to a first channel; and sending said interactive data for said second event to a second channel.

30. The method of claim 19 further including the steps of:

sending said interactive data for said first event to a first channel; and sending said interactive data for said second event to said first channel.

31. The method of claim 19 further including the steps of:

sending said interactive data for at least one aspect of said first event at a different time than said interactive data for at least one aspect of said second event.

32. The method of claim 19 further including the steps of:

sending said interactive data for at least one aspect of said first event at the same time as said interactive data for at least one aspect of said second event.

* * * * *